United States Patent
Day et al.

(10) Patent No.: US 6,356,984 B1
(45) Date of Patent: *Mar. 12, 2002

(54) DIGITAL DATA PROCESSING SYSTEM HAVING A DATA BUS AND A CONTROL BUS

(75) Inventors: William F. Day, Coral Springs; Susan L. Copeland, Plantation, both of FL (US); David A. Hill, Raleigh, NC (US); Mark J. Hornacek, Cooper City, FL (US); Michael K. Hosrom, Miramar, FL (US); Gavin J. Kirton, Pompano Beach, FL (US); Paula C. Kiser, Sunrise, FL (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,070

(22) Filed: Jun. 30, 1998

(51) Int. Cl.[7] .............................................. G06F 12/00
(52) U.S. Cl. ..................... 711/147; 711/138; 711/111; 711/154; 710/131; 370/351
(58) Field of Search .................................. 711/147, 138, 711/156, 111, 154; 710/131; 709/232, 251; 370/352, 355, 357, 362, 403, 404

(56) References Cited

U.S. PATENT DOCUMENTS

| | | | | |
|---|---|---|---|---|
| 4,090,035 A | * | 5/1978 | Popkin | 370/217 |
| 5,341,175 A | * | 8/1994 | Koz | 348/552 |
| 5,602,462 A | * | 2/1997 | Stich et al. | 323/258 |
| 5,768,551 A | * | 6/1998 | Bleiweiss et al. | 710/131 |
| 5,922,077 A | * | 7/1999 | Espy et al. | 714/7 |

* cited by examiner

Primary Examiner—Matthew Kim
Assistant Examiner—Matthew D. Anderson

(57) ABSTRACT

A digital data processing system comprises at least one subsystem comprising a plurality of resources, such as a storage subsystem comprising a plurality of drive modules, and a host processor. The host processor is connected to the drive modules through an interconnection which has a topology in the form of a loop. The interconnection has at least one configuration switch that is selectively configurable to a pass-through mode, in which the topology comprises the entire loop, or a bypass mode, in which the topology comprises a portion of the loop including the host processor and, possibly, at least one of the drive modules in the storage subsystem. The host processor can selectively condition the configuration switch into the pass-through mode or said bypass mode to connect more or fewer drive modules into the loop. Each of the disk modules further includes a disk module and a port by-pass switch, the port by-pass switch also being selectively configurable to a pass-through mode, in which the topology of the interconnection includes the disk module, and a bypass mode, in which the topology of the interconnection bypasses the disk module. The host processor can selectively condition the port bypass switches of the disk modules to connect more or fewer disk modules into the loop. The configuration switch and the port by-pass switches are directly controlled by a subsystem controller, which receives commands for controlling the switches from the host processor over a separate command interconnection.

25 Claims, 15 Drawing Sheets

DIGITAL DATA PROCESSING SYSTEM HAVING A DATA BUS AND A CONTROL BUS

FIELD OF THE INVENTION

The invention relates generally to the field of digital computer systems, and more particularly to systems for enabling one or more resources, such as disk storage devices, to be selectively shared among a plurality of host computers.

BACKGROUND OF THE INVENTION

A digital data processing system normally comprises a number of devices which are interconnected to enable information to be transferred thereamong for processing, storage, display, printing and the like. A number of interconnection arrangements have been used in digital data processing systems. In one particular arrangement, in which information is transferred using the well-known Fibre Channel protocol, the devices are connected in a ring topology, in which device DEV(1) transfers information to device DEV (2), and so forth. The last device DEV(L) in the ring transfers information to the first device DEV(1), thereby completing the ring. A ring interconnection using the Fibre Channel protocol has a number of advantages, most notably the fact that information can be transferred very rapidly, in particular up to the gigabit-per-second range.

There are several disadvantages, however, to the use of a ring interconnection topology. One disadvantage is that adding devices to a ring interconnection can be difficult and lead to failures. In addition, if a device fails, information transferred through the interconnection can be stopped or corrupted, depending on the cause of the failure, and locating the particular failing device and isolating the device can be difficult.

SUMMARY OF THE INVENTION

The invention provides a new and improved system and method for facilitating the sharing of resources such as storage subsystems among a plurality of host computers in a digital data processing system.

In brief summary, a digital data processing system comprises at least one subsystem comprising a plurality of resources, such as a storage subsystem comprising a plurality of drive modules, and a host processor. The host processor is connected to the drive modules through an interconnection which has a topology in the form of a loop. The interconnection has at least one configuration switch that is selectively configurable to a pass-through mode, in which the topology comprises the entire loop, or a bypass mode, in which the topology comprises a portion of the loop including the host processor and, possibly, at least one of the drive modules in the storage subsystem. The host processor can selectively condition the configuration switch into the pass-through mode or said bypass mode to connect more or fewer drive modules into the loop.

In a further aspect, each of the disk modules further includes a disk module and a port by-pass switch, the port by-pass switch also being selectively configurable to a pass-through mode, in which the topology of the interconnection includes the disk module, and a bypass mode, in which the topology of the interconnection bypasses the disk module. The host processor can selectively condition the port bypass switches of the disk modules to connect more or fewer disk modules into the loop. The configuration switch and the port by-pass switches are directly controlled by a subsystem controller, which receives commands for controlling the switches from the host processor over a separate command interconnection.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 6 and 7 depict operations performed in connection with an executive loop, and FIG. 8 is a flowchart for a state machine which controls transmission and reception of packets over a bus interconnecting the STC's and STD's.

FIG. 9 depicts a flowchart of a power-up reset and executive loop, FIG. 10 depicts a flowchart for a subroutine task for controlling processing of command packets received from an STC generation of response packets for transmission to the STC, FIG. 11 depicts a flowchart for a task in which the microcontroller processes state changes in drive power switches, FIG. 12 depicts a flowchart for a timer interrupt subroutine executed by the microcontroller, and FIG. 13 depicts a flowchart of an interrupt subroutine that is processed by the microcontroller when a information is received or transmitted by the STD to an STC.

DETAILED DESCRIPTION OF AN ILLUSTRATIVE EMBODIMENT

Figure 1:
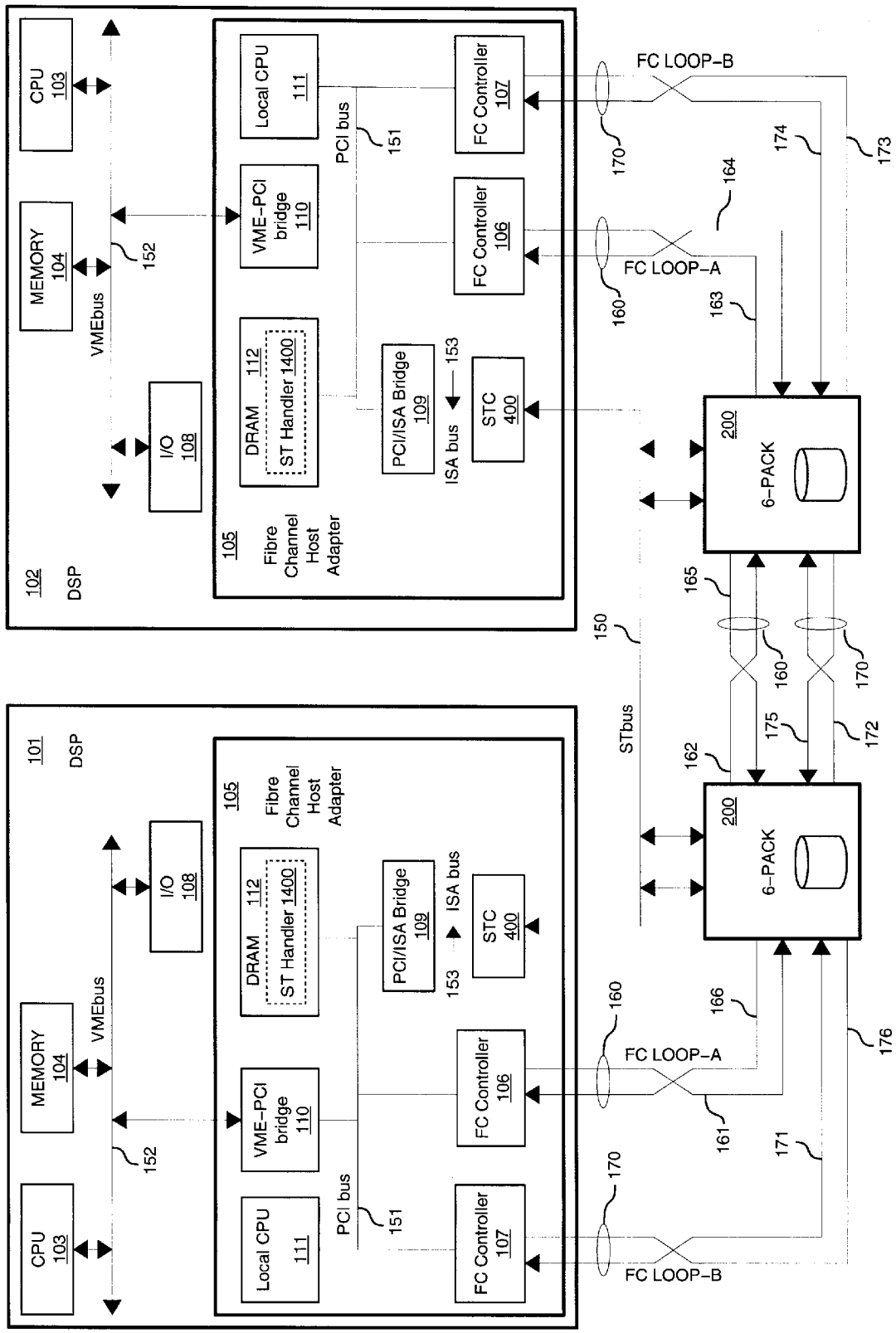
FIG. 1 is a functional block diagram depicting a digital computer system constructed in accordance with the invention.

FIG. 1 illustrates a digital computer system constructed in accordance with the invention. As depicted in FIG. 1, the system, in one embodiment, includes two Data Storage Processors 101 and 102 connected, as host computers, to a disk storage array comprising two disk storage subsystems, identified in FIG. 1 as "6-packs" 200, through several interconnections, including two Fibre Channel ("FC") loops FC Loop-A and FC loop-B, and a bus 150. The Fibre Channel loop-A 160 and Fibre Channel loop-B 170 generally comprise conventional Fibre Channel Arbitrated Loop (FC-AL) connections. Although the disk storage array is shown in FIG. 1 as comprising two disk storage subsystems ("6-packs"), it will be appreciated that a system constructed in accordance with the invention may include one such disk storage subsystem or more than two such disk storage subsystems. In addition, it will be appreciated that either or both of FC loop-A 160 and/or FC loop-B 170 may also include devices which are not disk storage subsystems.

Data Storage Processors 101 and 102 are general-purpose computer systems that have software and hardware modules for data storage and processing, and for connection to the FC loop-A 160, FC loop-B 170 and the bus 150. Each DSP 101 and 102 comprises a host Central Processing Unit (CPU) 103, Memory 104, Input/Output (I/O) controller 108, and a Fibre Channel Host Adapter 105, all interconnected by a bus 151. The Fibre Channel Host Adapter 105 includes a Local CPU 111, a controller (STC) 400 and two Fibre Channel Controllers 106 and 107. The STC 400 serves to connect the Fiber Channel Host Adapter 105 to the bus 150, and each Fiber Channel Controller 106 and 107 serves to connect the Fiber Channel Host Adapter 105 to a respective one of the fiber channel loops FC loop-A 160 and FC loop-B 170. STC 400, which in one embodiment has a conventional ISA ("Industry Standard Architecture) interface, connects to the bus 151 over an ISA bus 153 through a bridge 109.

Bus 150 connects STCs 400, located in DSPs 101 and 102, to the disk storage subsystems (6-packs) 200 in a multidrop manner. The bus 150 provides a control path, controllable by the DSP's 101 and 102, for configuring FC loop-A 160 and FC loop-B 170, and for switching disk drive ports onto each loop, as will be described below in connection with FIG. 2, by controlling electronic switches within each disk storage subsystem (6-pack) 200. The electronic switches can be controlled to individually configure each of the FC loops 160 and 170 to operate in several modes, including a pass-through mode, in which each loop extends between DSP 101 and 102, or in various segments, in which one DSP 101 or 102 can connect to various ones of the disk storage devices in the respective disk storage subsystems (6 packs) 200, as will be described below.

In the following, the disk storage subsystem (6-pack) 200 located on the left-hand side (as depicted in FIG. 1) will be referred to as the "left-side" disk storage subsystem (6-pack) and the disk storage subsystem (6-pack) 200 located on the right-hand side (as depicted in FIG. 1) will referred to as the "right-side" disk storage subsystem (6-pack). As noted above, each of the FC loop-A 160 and FC loop-B 170 comprises a respective Fibre Channel Arbitrated Loop. The loop topology associated with the FC loop-A 160 will be generally described in connection with FIG. 1, assuming that it is configured to be in the "pass-thru" mode for both FC loop-A 160; the loop topology for FC loop-B 170 is similar to that for FC loop-A 160 and will not be separately described.

Referring to FC Loop-A 160 in FIG. 1, that loop comprises a plurality of loop segments 161 through 166. In the pass through mode, data is transferred through loop segments 161 through 166 as follows. Starting from DSP 101, loop segment 161 connects a transmitter in the FC Controller 106 to a receiver of the left-side disk storage subsystem (6-pack) 200. Data is transferred through the left-side disk storage subsystem (6-pack) 200 and out over loop segment 162, which in turn connects to a receiver of the right-side disk storage subsystem (6-pack) 200. Data is then transferred through the right-side disk storage subsystem (6-pack) 200 and out over loop segment 163, which in turn connects to a receiver of FC Controller 106, located in DSP 102, thereby completing one-half of FC loop-A 160 extending from the DSP 101 to the DSP 102. The return path for FC loop-A 160, extending from the DSP 102 to the DSP 101, is as follows. Loop segment 164 connects a transmitter of FC Controller 106, in DSP 102, to a receiver of the right-side disk storage subsystem (6-pack) 200. Data is transferred through the right-side disk storage subsystem (6-pack) 200 and out over loop segment 165, which in turn connects to a receiver of the left-side disk storage subsystem (6-pack) 200. Data is transferred through the left-side disk storage subsystem (6-pack) 200 and out over loop segment 166 which in turn connects to a receiver of FC Controller 106, located in DSP 101, thereby completing the loop for FC loop-A 160.

Referring to FC loop-B 170 in the system depicted in FIG. 1, that loop comprises a series of loop segments 171 through 176, which connect between respective devices in a manner similar to loop segments 161 through 166, and form a loop for transferring data in a similar manner as described above for FC loop-A 160.

Figure 2:
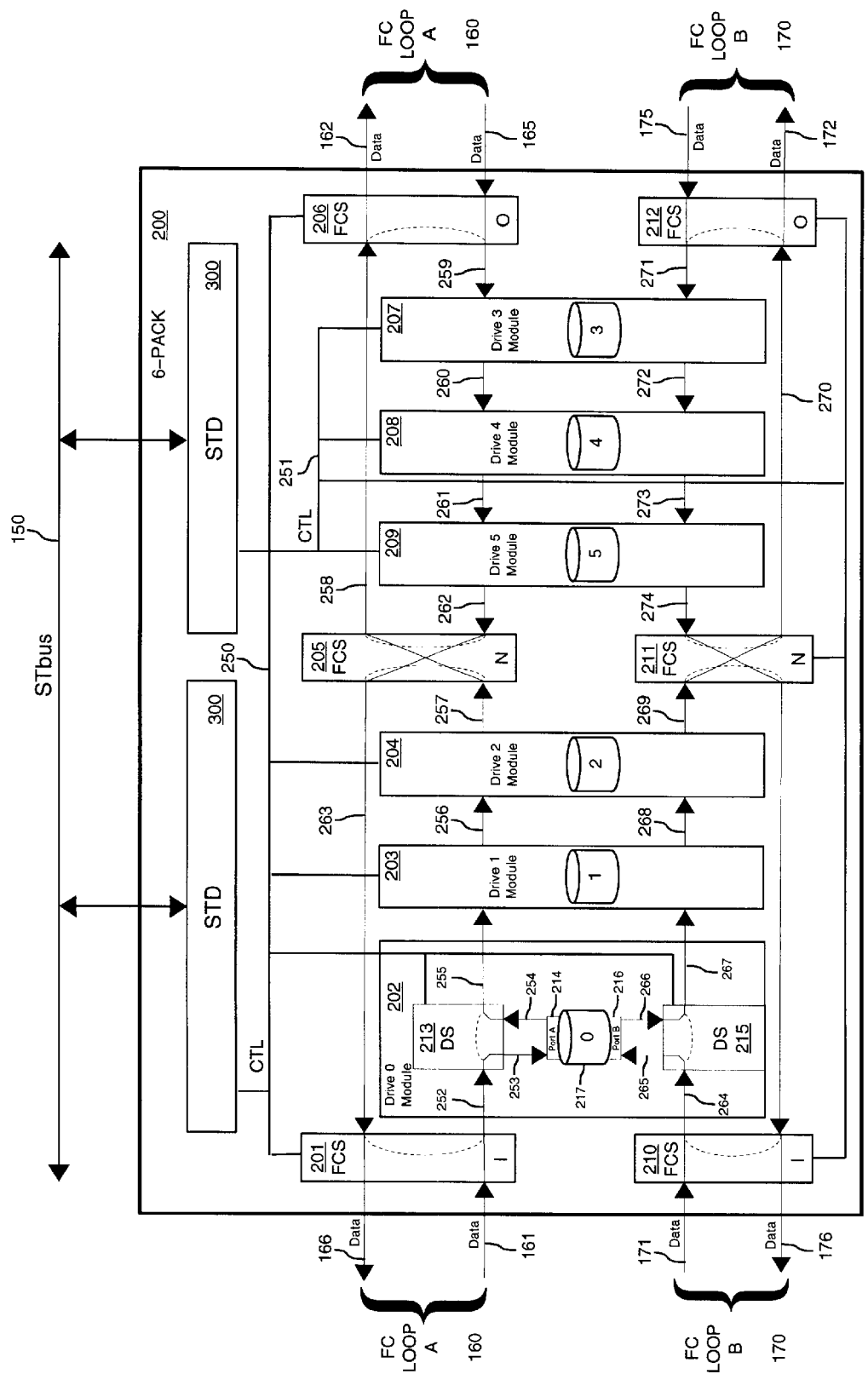
FIG. 2 is a block diagram showing the internal details of a disk storage subsystem used in the system depicted in FIG. 1.

FIG. 2 illustrates a functional block diagram of a disk storage subsystem (6-pack) 200 in the disk storage array used in the system depicted in FIG. 1. A disk storage subsystem (6-pack) 200 is divided into two sections, which will be referred to as "3-Packs," each of which includes three disk drive modules 202–204 and 207–209 and a respective disk section controller device ("STD") 300. The disk storage subsystem (6-pack) 200 includes six Fibre Channel configuration switches ("FCS") 201, 205, 206, 210, 211, and 212, that serve to configure the FC loops 160 and 170 as described below. In particular, configuration switches 201, 205 and 206 are used to configure the FC loop-A 160 and the configuration switches 210, 211 and 212 are used to configure the FC loop-B 170.

All of the drive modules 202–204, and 207–209 are generally similar and only one, identified by reference numeral 202 is shown in detail. Drive module 202 includes a disk drive unit 217 and two drive-port bypass switches ("DS") 213 and 215, with each drive switch 213, 215 serving to connect the disk drive 217 into, or disconnect the disk drive from, a respective FC loop 160, 170. Each STD 300 serves to control the drive port bypass switches 213 and 215 to control the connection of three of the disk drive modules to the FC loops 160 and 170. In particular, the "left-hand" (as shown in FIG. 2) STD 300, over a control connection ("CTL") 250 controls the drive port switches 213 and 215 of disk drive module 202, and corresponding disk port switches of the other disk drive modules 203 and 204 of the "left-hand" 3-Pack, to control the connection of those disk drive modules to the FC loops 160 and 170. Similarly, the "right-hand" (as shown in FIG. 2) STD 300, over a control connection ("CTL") 251, controls the disk port switches of the disk drive modules 207–209 of the "right-hand" 3-Pack, to control connection of those disk drive modules to the FC loops 160 and 170. In addition, the left-hand STD 300, over the control connection 250, controls the configuration switches 201, 205 and 206 which serve to configure the FC loop-A 160 through the disk storage subsystem ("6-Pack") 200, and the right-hand STD 300, over the control connection 251, controls the configuration switches 210, 211 and 212 which serve to configure the FC loop-B 170. The STDs 300 operate in response to configuration commands provided by the DSP's 101 and 102, which they receive over bus 150 as described below.

The path for FC loop-A 160 through the disk storage subsystem (6-pack) 200 will be described in connection with FIG. 2. The loop segments 161 and 166, shown on the left side of the disk storage subsystem (6-Pack) 200, and loop segments 162 and 165, shown on the right side of the disk storage subsystem (6-Pack) 200, provide external connections to connect the disk storage subsystem (6-pack) 200 in series to the FC loop-A 160. The disk storage subsystem (6-Pack) 200 receives data over loop segments 161 and 165 and it transmits data over loop segments 162 and 166. When the FC loop-A 160 is configured in pass-through mode each of the configuration switches 201, 205 and 206 is programmed by the left-hand STD 300 to be in a pass-through mode, in which

- (i) for the path from DSP 101 to DSP 102,
  - (a) configuration switch 201 connects segment 161 to segment 252, which, in turn, is connected to transfer data to the disk drive module 202, each disk drive module 202, 203 transfers data over respective segments 255, 256 to the next disk drive module 203, 204 and disk drive module 204 transfers data over segment 257 to configuration switch 205;
  - (b) configuration switch 205 connects segment 257 to segment 258, which, in turn, is connected to transfer data to configuration switch 206; and
  - (c) configuration switch 206 connects segment 258 to segment 162; and
- (ii) for the path from DSP 102 to DSP 101,
  - (a) configuration switch 206 connects segment 165 to segment 259, which, in turn, is connected to transfer data to the disk drive module 207, each disk drive module 207, 208 transfers data over respective segments 260, 261 to the next disk drive module 208, 209 and disk drive module 209 transfers data over segment 262 to configuration switch 205;
  - (b) configuration switch 205 connects segment 262 to segment 263, which, in turn, is connected to transfer data to configuration switch 201; and
  - (c) configuration switch 201 connects segment 263 to segment 166.

In the FC loop-A 160, the left-hand STD 300 can individually program each of the configuration switches 201, 205 and 206 to be in a bypass mode (which may also be referred to as a "loopback" mode). When configuration switch 201 is in the bypass mode, it connects segment 263 to segment 252, and disconnects segments 161 and 166 from segments 252 and 263, respectively. In this condition, the DSP 101 will be disconnected from the portion of the FC loop-A 160 which includes data storage subsystem (6-Pack) 200 and any other devices which may be connected in the FC loop-A 160 between the disk storage unit (6-Pack) 200 and the DSP 102, and the DSP 102 itself. However, if the configuration switches 205 and 206 are in pass-through mode, and if any configuration switches in devices between the data storage subsystem (6-Pack) 200 and the DSP 102 are in pass-through mode, the portion of the FC loop-A 160 will include the DSP 102 and all of the disk drive modules 202–204 and 207–209 in the data storage subsystem (6-Pack) 200.

On the other hand, when the configuration switch 206 is in the bypass mode, it connects segment 258 to segment 259. In this condition, the DSP 102 will be disconnected from the portion of the FC loop-A 160 which includes the disk storage subsystem (6-Pack) 200 and any other devices which may be connected in the FC loop-A between the disk storage unit (6-Pack) 200 and the DSP 101, and the DSP 101 itself. However, if the configuration switches 201 and 205 are in pass-through mode, and if any configuration switches in devices between the data storage subsystem (6-Pack) 200 and the DSP 101 are in pass-through mode, the portion of the FC loop-A 160 will include the DSP 101 and all of the disk drive modules 202–204 and 207–209 in the data storage subsystem (6-Pack) 200.

Finally, when the configuration switch 205 is in the bypass mode, it connects segment 257 to segment 263 and segment 262 to segment 258. In this condition, the DSP 101 will be disconnected from the portion of the FC loop-A 160 which includes the disk drive modules 207–209 comprising the right-hand 3-Pack, and the DSP 102 will be disconnected from the portion of the FC loop-A 160 which includes the disk drive modules 202–204 comprising the left-hand 3-Pack. However, if the configuration switch 201 is in pass-through mode, and if any configuration switches in devices between the data storage subsystem (6-Pack) 200 and the DSP 101 are in pass-through mode, one portion of the FC loop-A 160 will include the DSP 101 and the disk drive modules 202–204. Similarly, if the configuration switch 206 is in pass-through mode, and if any configuration switches in devices between the data storage subsystem (6-Pack) 200 and the DSP 102 are in pass-through mode, a second portion of the FC loop-A 160 will include the DSP 102 and the disk drive modules 207–209. Thus, when configuration switch 205 is in bypass mode, the FC loop-A 160 can be configured into two separate Fibre Channel loops.

The right-hand STD 300 can program switches 210, 211 and 212 to configure the FC loop-B 170 in a manner similar to that described above in connection with switches 201, 205 and 206, respectively.

Each of the drive-port bypass switches 213 and 215 in the disk drive module 202 can also be individually programmed by the left-hand STD 300 to be in a pass-through mode or a bypass mode. When the respective drive-port bypass switch 213, 215 is in the pass-through mode, the disk drive 217 is connected into the respective FC loop-A 160, FC loop-B 170. On the other hand, when the respective drive-port bypass switch 213, 215 is in the bypass mode, the disk drive 217 is not connected into the respective FC loop-A 160, FC loop-B 170. In particular, when the drive-port bypass switch 213 is in the pass-through mode, it connects segment 252 to segment 253, which, in turn, is connected to port A 214 of disk drive 217, thereby to transfer data from segment 252 to the disk drive 217. The port A 214 is also connected to segment 254 and the drive-port bypass switch 213, when in the pass-through mode, connects segment 254 to segment 255, thereby to facilitate the transfer of data from the port A 214 to segment 255 and the next disk drive module 203 in the data storage subsystem (6-Pack) 200. On the other hand, when the drive-port bypass switch 213 is in the bypass mode, it connects segment 252 directly to segment 255, and disconnects at least segment 254 from segment 255, so that data from segment 252 is transferred to segment 255 and the next disk drive module 203 in the data storage subsystem (6-Pack) 200. Similarly, the drive-port bypass switch 215, when in the pass-through mode connects the port B 216 to FC loop-B 170 to facilitate the transfer of data to the disk drive 217, or when in the bypass mode bypasses port B 216. In addition, corresponding drive-port bypass switches (not separately shown) in the other disk drive modules 203, 204 and 207–209 operate similarly to selectively connect their disk drives (not separately shown) in, or to bypass, the respective FC loops 160 and 170.

Figure 3:
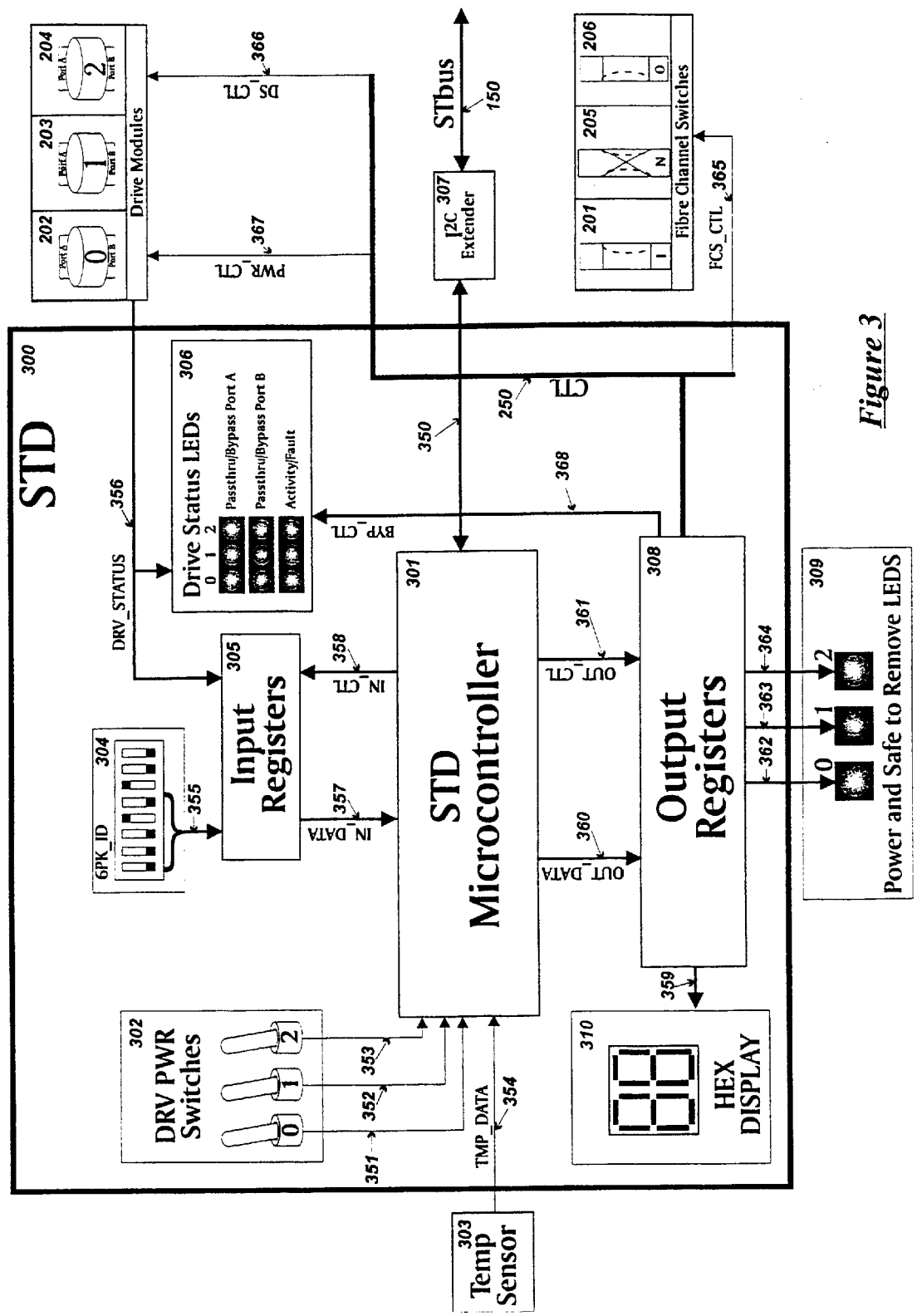
FIG. 3 is a block diagram showing the internal details of a device controller (STD) used in configuring and monitoring disk storage modules in the disk storage subsystem depicted in FIG. 1.

The structures of the STDs 300 are generally similar, and only one, in particular the left-hand STD 300 (as depicted in FIG. 2) will be described in detail. FIG. 3 is a functional block diagram of left-hand STD 300. As noted above, the left-hand STD 300 controls the left-hand 3-Pack comprising disk drive modules 202–204 and the configuration switches 201, 205 and 206 for the FC loop-A 160 over CTL path 250. The STD 300 is controlled by an STD Microcontroller 301 which, in one embodiment, is a general purpose microcontroller provided with three general-purpose I/O ports, one of which connects to bus 150 through an interface/bus extender 307, to facilitate the reception of information from, and the transfer of information to, the DSP's 101 and 102, as will be described below in connection with FIG. 5.

The microcontroller 301 executes a firmware program which is maintained in an internal memory, which will be described below in detail in connection with FIGS. 9 through 13. The microcontroller 301 monitors the switch settings of a switches 0, 1 and 2 of drive power switches 302 over connections 351, 352, and 353, respectively. It also monitors the enclosure temperature inside the housing (not separately shown) of disk storage subsystem (6-pack) 200 as determined by a temperature sensor 303 over connection 354. The STD Microcontroller 301 controls various components, including the conditions of the configuration switches 201, 205 and 206 and the drive-port bypass switches 213 and 215, by loading data into a set of output registers 308. The STD controller provides data, in the form of OUT_DATA signals, to be loaded into the output registers 308 over connection 360. The output registers 308, in turn, are controlled by OUT_CTL output control signals provided over connection 361. The STD 300 also includes a set of light-emitting diodes 309, the condition of which are controlled from the output registers 308 over connections 362, 363, and 364, respectively, to provide a visual display of the power status of the disk drive modules 202–204 which are controlled by the STD 300. In addition, the STD includes a display 310, which displays the temperature and the setting of a switch bank 304, is controlled from the output register 308 through path 359. The switch bank 304, in turn, provides an address for the STD 300 and the drive modules 202–204 on the bus 150.

The modes of respective Fibre Channel configuration switches 201, 205, and 206 are controlled by information in the output registers 308 over a connection 365 portion of CTL 250. The modes of the drive-port bypass switches 213 and 215 of disk drive module 202, and corresponding drive-port bypass switches of disk drive modules 203, and 204, are controlled from the output registers 308 by DS_CTL disk control signals provided over a connection 366 portion of CTL 250. Similarly, the drive power of drive modules 202, 203, and 204 is controlled by the output registers 308, which provide PWR_CTL power control signals over a power control connection 367 portion of CTL 250. The STD 300 also includes a set of drive status LEDs 306, which display the modes for each of the respective drive-port bypass switches of the respective disk drive modules 202–204 and the operational status of the respective drive modules 202, 203, and 204. The LED's 306 which identify the modes for the respective drive-port bypass switches are controlled by the output registers 308 over connections 368 and the LED's 306 which identify the operational status of the disk drive modules 202–204 are controlled by DRV_STATUS drive status signal which are received over connection 356.

The microcontroller 301 also receives and monitors the operational status of the disk drive modules 202–204 through a set of input registers 305. The input registers 305, in turn receive the DRV_STATUS drive status signals representative of the operational status information from each of the drive modules 202–204. The input registers 305 provide this information to the microcontroller 301 as IN_DATA input data signals over a line 357, under control of IN_CTL input control signals over a line 358. The input registers 305 also receive the switch settings of switches 304 over line 355.

Figure 4:
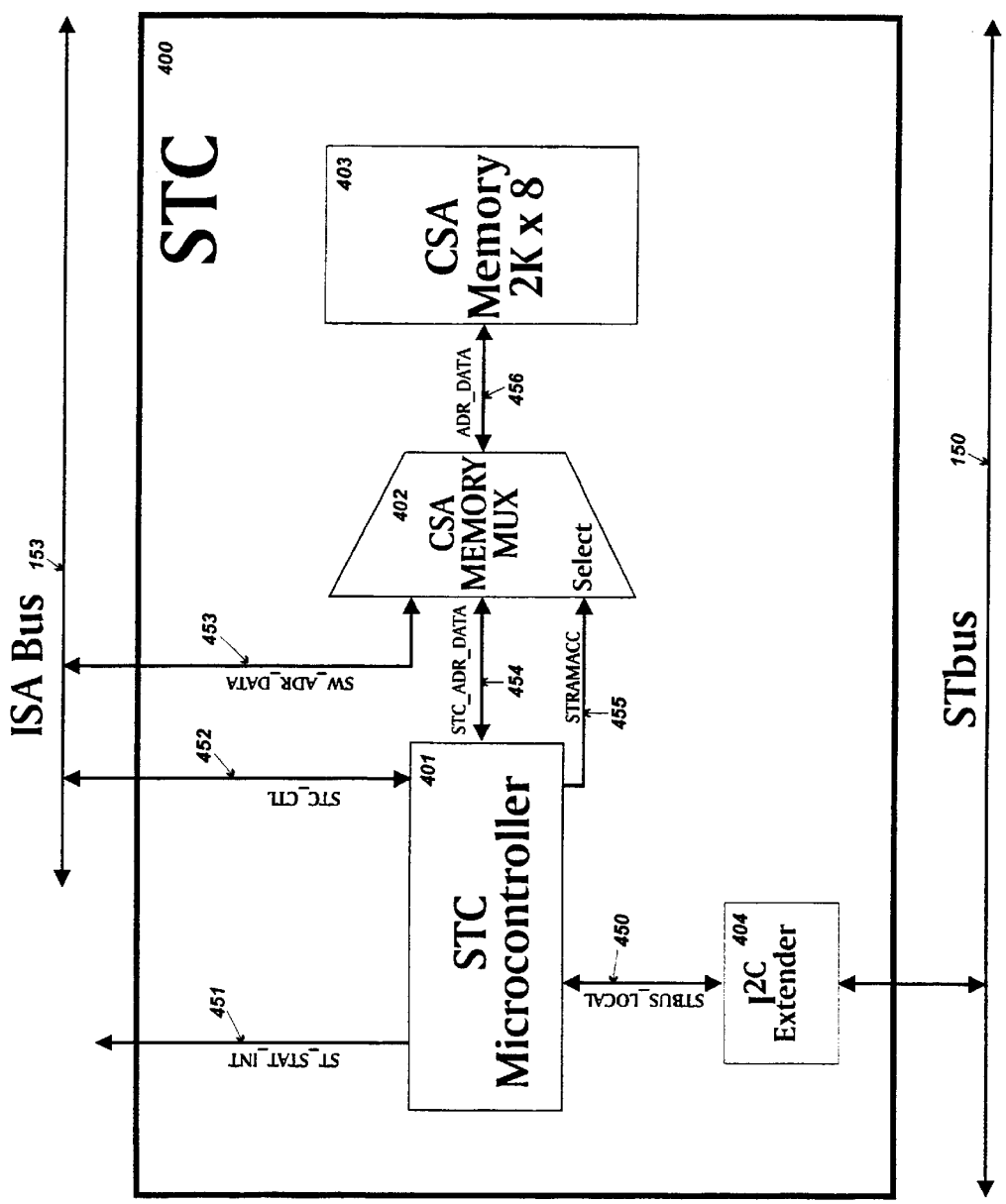
FIG. 4 is a block diagram showing the internal details of a controller (STC) in a data storage processor (DSP) that transmits commands to the disk storage subsystems for configuring and monitoring the device controller (STD) and receives status information therefrom.

FIG. 4 depicts a functional block diagram of an STC 400 (FIG. 1) used in the DSP's 101 and 102. As noted above, an STC transfers commands to the STD's 300 of the data storage subsystems (6-Packs) 200 and receives status and other information therefrom over the bus 150. In addition, the STC's 400 of the DSP's 101 and 102 transfer information therebetween to facilitate coordination as between the DSP's 101 and 102 of the configuration of the FC loops 160 and 170. The STC 400 includes a microcontroller 401, a multiplexer/demultiplexer 402, a memory 403 and a bus interface 404. The microcrontroller 401 executes a firmware program which resides in memory. Details of the operations performed in connection with the firmware program will be described below in connection with FIGS. 6, 7, and 8. The handler 1400 (FIG. 1), in turn, controls the microcontroller 401 by means of STC_CTL control signals which are provided over a control portion 452 of the ISA bus 153. The microcontroller 401 also can generate ST_STAT_INT status interrupt signals for transmission over a line 451 to send interrupts to the local CPU 111 for processing under control of the handler 1400.

The multiplexer/demultiplexer 402, under control of a ST_RAM_ACC memory access control signal, selectively controls access to the memory 403 by the controller 401 and components external to the STC 400, most notably the local CPU 111 of the Fibre Channel Host Adapter 105. The microcontroller 401 is connected over an address/data bus 454 to one input/output terminal of multiplexer/demultiplexer 402, and an address/data bus 453, which forms a portion 453 of the ISA bus 153 which connects the bridge 109 to the STC 400, is connected to a second input/output of multiplexer/demultiplexer 402. The output/input of multiplexer/demultiplexer 402, in turn, is connected to memory 403 over an address/data bus 456. When the microcontroller 401 is, for example, asserting the ST_RAM_ACC memory access control signal, the multiplexer/demultiplexer couples signals between the busses 454 and 456. In that case, the microcontroller 401 can provide an address in memory 403, which the multiplexer/demultiplexer 402 transfers from the microcontroller 401 to the memory 403 for storage. If the address identifies a location in memory 403 in which data from the microcontroller 401 is to be stored, the microcontroller 401 will also transfer data over bus 454, which the multiplexer/demultiplexer 402 will transfer over the bus 456 to memory 403. On the other hand, if the address identifies a location in memory 403 from which data is to be transferred to the microcontroller 401, the memory 403 will transfer data from that location over bus 456, which multiplexer/demultiplexer 402 will transfer over the bus 454 to microcontroller 401. Similar operations will occur in connection with transfer of addresses and data between ISA bus 153 and memory 403 over busses 453 and 456 when the microcontroller 401 negates the ST_RAM_ACC memory access control signal.

The bus interface 404 serves to interface the STC 400 to the bus 150. The microcontroller 401 connects to the bus interface 404 over a line 450. The microcontroller 401 can enable information, including commands for execution by the STD's 300 of the respective disk storage subsystems (6-Packs) 200, to be transferred over the bus 150 by transferring information to the bus interface 404 over line 450. Similarly, the bus interface 404 can receive information, including status information received from the STD's 300 of the respective disk storage subsystems (6-Packs) 200, from the bus 150 and provide it (that is, the information) to the microcontroller 401 over line 450.

Figure 5:
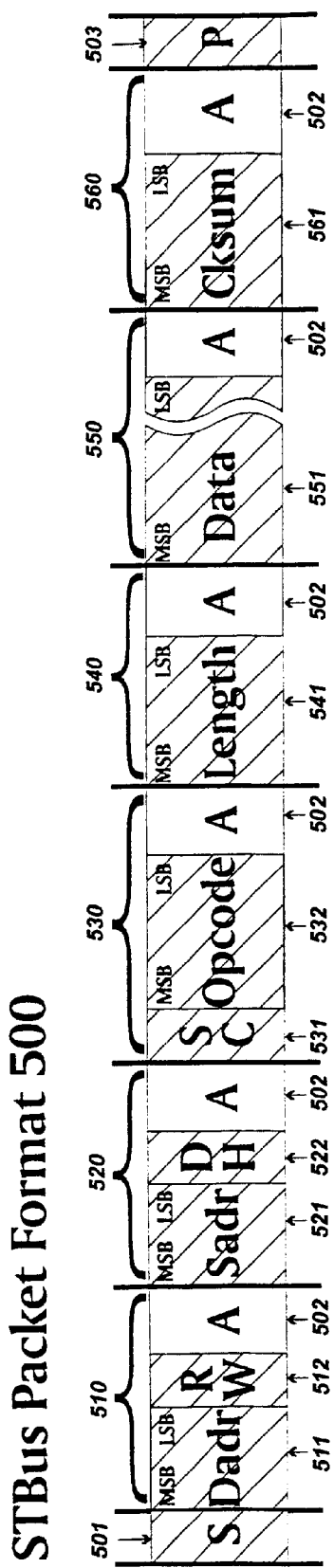
FIG. 5 is a diagram depicting the format of a packet transferred between the controller (STC) in the data storage processor (DSP) and the device controllers (STD) in the disk storage subsystems used to transfer commands from the DSP controller (STC) to the device controllers (STD) and status information from the device controllers (STD) to the DSP controller (STC).

The STC's 400 and STD's 300 transfer information over bus 150 in the form of packets. In one embodiment, the bus 150 is implemented in the form of an I2C serial data bus defined by Philips Semiconductor Corporation, and in that embodiment the packets transferred over bus 150 generally conform to the I2C standard. FIG. 5 depicts the format of a packet 500 transferred over the bus 150. Packet 500 comprises a series of fields, referred to as "framing states," including a start bit 501, a destination address state 510, a source address state 520, an "opcode" (operation code) state 530, a length state 540, a data state 550, a checksum state 560, and a stop bit 503. The start bit 501 identifies the beginning of a packet 500 and the stop bit identifies the end of a packet. Each of the other states 510, 520, 530, 540, 550 and 560 comprises a parameter sub-field 511 and 512 (in the case of state 510), 521 and 522 (in the case of state 520), 531 and 532 (in the case of state 530), 541 and 542 (in the case of state 540), 551, and 561, respectively, followed by the acknowledge-bit (A-bit) 502. The contents of the states 501 and 503 and of sub-fields 511 and 512, 521 and 522, 531 and 532, 541, 551 and 561, which are shown in FIG. 5 with slash lines therethrough are provided by the source device. On the other hand, the contents of the sub-fields 502, which are shown in FIG. 5 without slash lines therethrough, are provided by a destination device.

In the packet 500, the destination address state 510 (which is also referred to as the "Slave Address" state) includes a destination address (Dadr) sub-field 511, a read-write bit (R/W) 512, and the acknowledgment sub-field 502. The source address state 520 includes a source address (Sadr) sub-field 521, a Device/Host bit (D/H) bit 522, and the acknowledgment bit 502. When the D/H-bit 522 is set (corresponding to the value "one"), the packet was sent by an STD 300, whereas when the D/H bit 522 is clear (corresponding to the value "zero"), the packet was sent by an STC 400. The destination device controls the condition of the aforementioned A-bit 502. The opcode state 530 includes of a Status/Command bit (S/C) 531, an operation code sub-field 532, and the acknowledgment bit 502. The length state 540 includes a length sub-field 541, and the acknowledgment bit 502. If the length sub-field contains a non-zero value, the data state 550 will follow the length state 540 and include a data sub-field 551, and an acknowledgment bit 502. The checksum state 560 follows either the data state 550 or the length state 540, depending on whether the length field indicates that the packet 500 includes a data state 550. In either case, the checksum state 560 includes a checksum sub-field, and an acknowledgment bit 502. The Stop bit (P) state 503 that follows the Checksum state 560 terminates the STbus Packet 500.

As noted above, a packet 500 can contain either commands or status responses. A source device, which may comprise the STC 400 of the Fibre Channel host adapter 105 of either DSP 101 or 102 (in the case of commands), or the STD's 300 of the disk storage arrays (6-Packs) 200 (in the case of status responses), arbitrates for the bus 150 and transmits a packet to a destination device(s). A destination device, which may receive a packet from a source device when the Dadr 511 field contains either the device's address or a General Call address (00H). A device that initiates a command transfer is called a Commander, and one that initiates a status response transfer is called a Responder. A source device, after transmitting a packet including a command, as a Commander, to one or more destination devices, expects to receive a status response packet from the destination device(s). A destination device that accepts a command packet becomes a Responder and returns either a normal or an abnormal status response to the Commander. The STC 400, for example, can act both as Commander and Responder, whereas, the STD 300 acts only as a Responder. When a Commander receives the status response, it (in particular, the microcontroller 401) loads a status indication in the memory 403 for retrieval and processing by the respective handler 1400. For a command packet, if a device connected to the bus 150 determines that the destination address sub-field 511 contains either the destination's own address on bus 150, or the General Call address (00H), the packet conforms to the packet format as described above, the checksum in sub-field corresponds to a checksum value as generated by the device, and the packet does not contain any framing errors or transfer time-out errors as described below, the device will accept the packet as a destination device, otherwise the device will disregard the packet.

Several types of errors can occur in connection with transfers of packets, in particular, framing errors and transfer time-out errors. A framing error occurs when a packet transfer begins with the S-bit framing state 501 but the rest of the packet does not conform to the packet framing sequence as described above in connection with FIG. 5. A transfer time-out error occurs when any one of the packet framing states fail to complete within a predetermined time-out period. Packet transfer exceptions are handled as follows:

A source device operating as a Commander will terminate the transfer using the Stop bit (P) framing state 503 and, after a predetermined time delay, will attempt to retry transmission of the command packet. If an error occurs in connection with the retry, the source device will abort the command function and load a status indication in the memory 403 indicating the error, which can be processed by the Handler 1400.

A source device operating as a Responder will terminate the transfer using the Stop bit (P) framing state 503 and will not again attempt to transfer the response packet. The Commander handles this exception when it detects a time-out error waiting for the response packet.

A destination device operating either as a Commander or as a Responder will terminate the transfer using the Stop bit (P) framing state 503 and disregard the incomplete packet.

As noted above, an STC 400 of a Fibre Channel host adapter 105 of a DSP 101, 102, operates in response to commands from the handler 1400. The various types of commands which may be provided by the handler 1400 in one embodiment will now be described. Generally, the handler 1400 will enable commands to be loaded into the memory 403 for retrieval and execution by the STC 400, in particular, by the microcontroller 401. After the microcontroller 401 has executed a command, it will store a status indication in the memory 403 and assert the ST_STAT_INT interrupt signal to enable processing under control of the handler 1400. The handler 1400 will enable the status indication to be retrieved from the memory 403 and processed to determine whether the command was completed. The various types of commands include:

(i) An STC INIT (initialization) command, which enables the STC 400 to enable its interface to bus 150 and to start scanning the bus 150 for a non-assigned device address in which it assigns to itself, and to continue scanning in order to determine what device addresses are used by the other devices connected to the bus 150. When the microcontroller 401 has completed execution of the command, it will load, as the status indication, a list of all the valid device addresses, whether or not a device was found present therewith, and also its own self-assigned address. Thereafter, the microcontroller can execute other commands and receive packets from the bus 150.

(ii) An STC ATTN_POLL_START (attention poll start) command, which enables the STC 400 to start Attention polling of devices connected to bus 150 whose addresses are among a list of device addresses provided by the handler 1400 in the memory 403. The microcontroller 401 will store this address list in an internal memory and determine whether the list satisfies predetermined conditions. If the microcontroller 401 determines that the address list satisfactory, it will start polling and thereafter load, as the status indication, an indication as to whether the polling was successful. If the microcontroller 401 determines that the polling was successful, it will enable the STC 400 to send a packet over the bus 150 including an Attention command (that is, a packet in which the opcode 532 field indicates an Attention command) to each device listed and continues polling until one of a number of polling conditions is detected, for example:

General Health Checking—STC 400 sends a packet with the attention command using a particular destination address and determines that no device is connected to bus 150 which has that address, or, if a device is connected to bus 150 which has that address, that the device is not inoperable.

Device requires attention—STC 400 sends a packet with the attention command using a particular destination address and determines, from the response packet, that the device requires attention. The device, as a Responder, will indicate that it requires attention by setting an attention status indicator in its status-response packet. An STD 300 may do this, for example, when it detects a transition on one of its drive power switches 302 (FIG. 3), in which case it will set an attention status indicator for this switch.

Device Presence monitoring—STC 400 sends a packet with the attention command using a particular destination address and determines, from the response packet, that a device is present which has that address. This can be used to, for example, determine if a device becomes present with that destination address after polling commences, which may occur if, for example, a device connected to bus 150 is powered-up after polling commences.

After the microcontroller 401 detects one of these conditions, it will load a status indication in the memory 403. If the microcontroller 401 loads a status indication for any one of these polling services, then polling is stopped only for that address, thereby to prevent repetitive status postings. The handler 1400 may re-enable polling for any specific device by re-issuing this command, but it will generally do so after it takes the appropriate actions deemed necessary for the type of attention status.

(iii) An STC ATTN_POLL_STOP (attention poll stop) command, which enables the microcontroller 401 to initiate an orderly stop of the Attention polling that was started in response to the ATTN_POLL_START command. The STC 400 stops once it completes polling of the current device address and then loads a completion status indication in the memory 403.

(iv) A SEND USER PACKET command, which enables the microcontroller 401 to initiate transmission of a user specified packet (that is, packets in which the S/C sub-field 531 and opcode sub-field 532 indicating a user-specified condition) over bus 150 to another device as destination device connected to bus 150. This command may be used for, for example, for transfers between STC's 400 of different DSP's 101, 102, for, for example, diagnostic purposes, or, to send commands of types that are not otherwise provided to STDs 300 of the disk storage subsystems (6-Packs) 200. The microcontroller 401 loads a normal completion status indication in memory 403 after the destination device, as Responder, returns an appropriate status response packet.

(v) An STD INQUIRY command, which enables the microcontroller 401 to initiate the transmission of a packet including an Inquiry command over bus 150 to a specified STD 300. The STD 300, in turn, will return an Inquiry status response packet, in which the current mode setting of the Fibre Channel configuration switches and drive-port bypass switches which are controlled thereby. The STD 300 also includes in the Inquiry status response packet status information related to the operational conditions and temperature within the disk storage subsystem (6-pack) 200, each drive present and powered-on status, and general error status of the STD 300. The microcontroller 401 loads a normal completion status indication in memory 403 after it receives the expected status response packet from the Responder.

(vi) A number of other commands form a Mode Select command group. Commands in this group include a sub-command field called the Mode Select function byte, located in the first Data sub-field 551, that defines the command type. Some illustrative commands in this group include:

(a) An STD FCS (Fibre Channel configuration switch control) command, which enables the microcontroller 401 to initiate the transmission of a packet including a Mode Select command with a Mode Select function byte to a specified STD 300. This command enables the STD 300 to, in turn, program the Fibre Channel configuration switches 201, 205 and 206, or 210, 211 and 212, (FIG. 2) which are controlled by the specified STD 300 to configure FC loop-A 160 or FC loop-B 170, respectively. The microcontroller 401 loads a normal completion status indication in memory 403 after it receives a Mode Select status response packet from the STD 300 which is the Responder.

(b) An STD DS (drive-port bypass switch configuration) command, which enables the microcontroller 401 to initiate the transmission of a packet including a Mode Select command with a DS Mode Select function byte to a specified STD 300 device. This command enables the STD 300 to, in turn, program respective DS switches 213 and 215 (FIG. 2) which are controlled by the specified STD 300 to configure each drive module's drive-port bypass switches into a respective bypass mode or pass-thru mode. The microcontroller 401 loads a normal completion status indication in memory 403 after it receives a Mode Select status response packet from the STD 300 which is the Responder.

(c) An STD DRIVE POWER ON/OFF command, which enables the microcontroller 401 to initiate the transmission of a packet including a Mode Select command with a DRIVE POWER ON/OFF Mode Select function byte to a specified STD 300 device. This command enables the STD 300 to, in turn, turn a specified drive's power On or Off, as described above in connection with FIG. 2. The microcontroller 401 loads a normal completion status indication in memory 403 after it receives a Mode Select status response packet from the STD 300 which is the Responder.

(d) An STD FLASH LED command, which enables the microcontroller 401 to initiate the transmission of a packet including a Mode Select command with a Flash LED Mode Select function byte to a specified STD 300 device. This command enables or disables the flashing of an LED 306 and 309 (FIG. 3) which are associated with one of the drive modules 202–204 which are associated with a device address also provided in the packet. The microcontroller 401 loads a normal completion status indication in memory 403 after it receives a Mode Select status response packet from the STD 300 which is the Responder.

(e) An STD SENSE command, which enables the microcontroller 401 to initiate the transmission of a packet including a Mode Select command with a the SENSE Mode Select function byte to a specified STD 300 device. This command enables the specified STD 300 to generate a response packet in which it returns its operational status. The microcontroller 401 loads a normal completion status indication in memory 403 after it receives a Mode Select status response packet from the STD 300 which is the responder.

Figure 6:
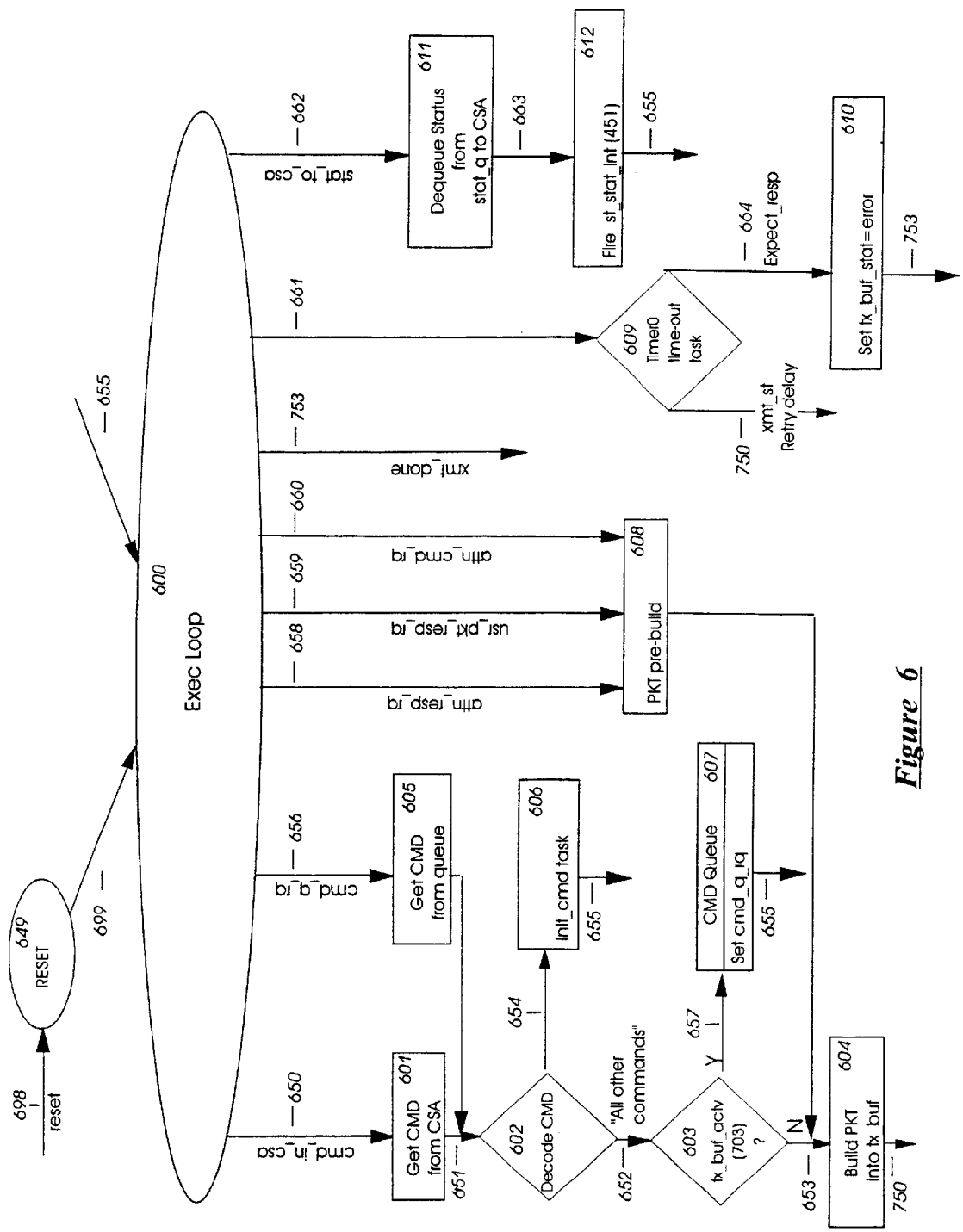
FIGS. 6 through 8 are flowcharts depicting operations performed by a microcontroller controlling the STC (FIG. 4).
Figure 7:
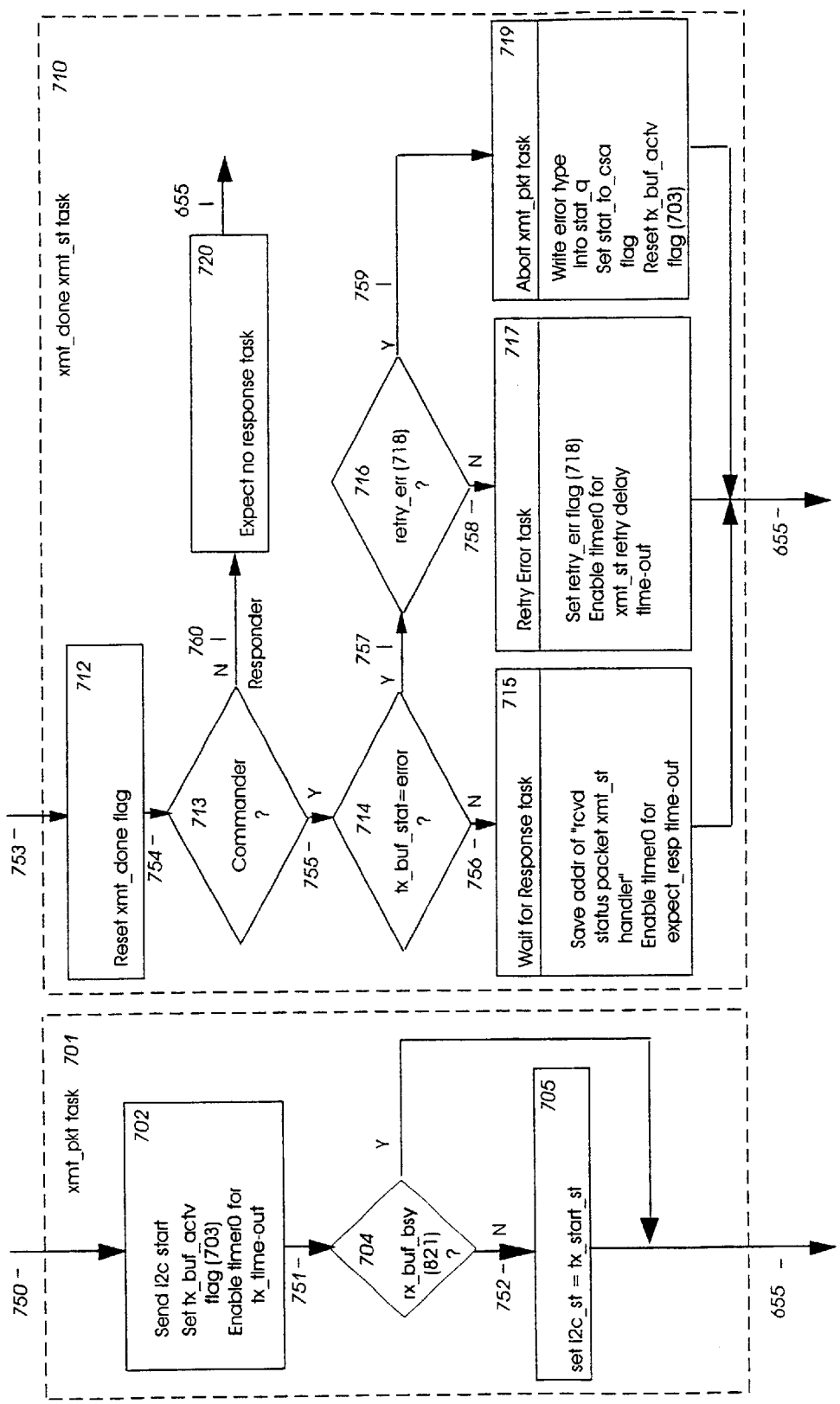
Figure 8:
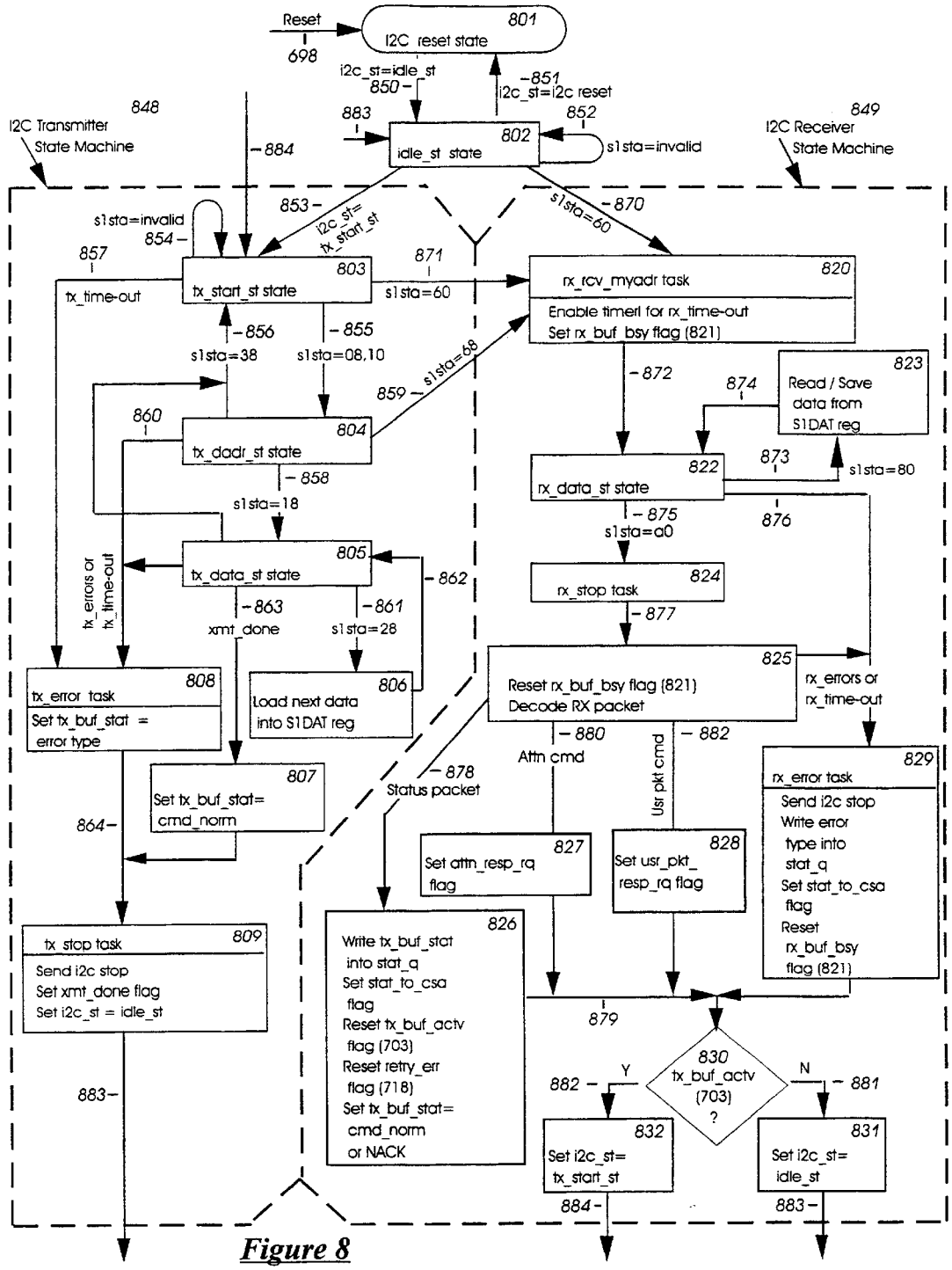

FIGS. 6 through 8 are flowcharts depicting operations performed by the STC's microcontroller 401 (FIG. 3). FIGS. 6 and 7 depict operations performed in connection with an executive loop 600, and FIG. 8 is a flowchart for a state machine which controls transmission and reception of packets over the bus 150.

With reference to FIG. 6, initially a reset signal 698 causes the microcontroller 401 to enter a firmware Reset state 649 where a set of microdiagnostic tests are performed. If the tests are passed, the microcontroller 401 prepares context for accepting commands from the software, and then moves through step 699 to the executive loop 600 itself. The microcontroller 401, when operating in the executive loop 600, monitors the conditions of a predetermined set of activity flags. When the microcontroller 401 determines that activity flag is true, together with other qualifying conditions as described below, the microcontroller 401 moves through paths 650, 656, 658, 659, 660, 753, 661, or 662, respectively, to process a respective task associated with the activity flag, as described below.

When the microcontroller 401 determines that a cmd__in__csa flag, indicating that the handler 1400 has loaded a command into the memory 403, the microcontroller 401 firmware sequences along path 650 to the "Get CMD from CSA" task 601. In that task 601, the microcontroller 401 will retrieve the command from the memory 403 and then moves through path 651 into the "Decode CMD and decision" task 602 to decode the command and prepare context for its execution. If the microcontroller 401 in task 602 decodes the command as the STC INIT (initialization) command, then the microcontroller 401 moves through path 654 to the Init__cmd task 606. In processing task 606, the microcontroller 401 executes the STC INIT command function as described above, and then moves through path 655 to return to the executive loop 600.

If the microcontroller 401, in processing task 602, decodes the command other than a STC INIT command, then the microcontroller 401 moves through path 652 to a tx__buf__actv decision task 603. The microcontroller 401 sequences to task 603 for all commands except the STC INIT command. In task 603, the microcontroller 401 determines whether to execute or queue the command depending on the condition of a tx__buf__actv (transmit buffer active) flag. If the microcontroller 401 determines in task 603 that the tx__buf__actv flag is false, the microcontroller 401 moves through path 653 to a Build PKT (build packet) task 604 to prepare a packet for transmission. Following task 604, the microcontroller 401 sequences through path 750 to a task 702 within the xmt__pkt (transmit packet) task 701, which is shown in FIG. 7.

The xmt__pkt task 701 comprises task 702, 704, and 705, and is used by the microcontroller 401 to initiate the transmission of a packet 500 over the bus 150. In task 702, the microcontroller 401 sets the tx__buf__actv (transmit buffer active) flag and enables a transmission time-out timer0 used by a bus transmission state machine 848 (described below in connection with FIG. 8). Following task 702, the microcontroller 401 moves through path 751 to a task 704. In task 704, the microcontroller 401 determines the condition of a rx__buf__bsy (receive buffer busy) flag. If the microcontroller 401 determines in task 704 that the rx__buf__bsy flag is false, which will be the case if the bus state machine (described below in connection with in FIG. 8) is in an idle state, the microcontroller 401 moves through path 752 to a task 705. In task 705, the microcontroller 401 sets an "i2c__st" variable equal to tx__start__st ("transmit start state), which enables the bus state machine (FIG. 8) to move from the idle state 802 through path 853 to a tx__start__st state 803. When the microcontroller 401 has completed task 705, it moves through path 655 to the executive loop 600.

With reference again to task 704, if the microcontroller 401 determines in that task that the rx__buf__bsy (receive buffer busy) flag is true, it will move through path 655 to return to the executive loop 600. This will occur if a receiver state machine 849, which comprises a portion of the bus state machine depicted in FIG. 8, is currently busy controlling the reception of a packet from the bus 150. When the receiver state machine 849 completes, it will exit through task 832, which sets the "i2c__st" variable equal to the tx__start__st, and then passes through path 884 to the tx__start__st state 803.

Referring back to decision task 603, if microcontroller 401 determines in that task 603 that the tx__buf__actv (transmit buffer active) flag it is true, the microcontroller 401 moves through path 657 to a CMD Queue (command queue) task 607, which enables the microcontroller 401 to defer execution of the command execution since the transmitter buffer is busy. The microcontroller 401 then moves through 655 to return to the executive loop 600.

When the microcontroller 401, in processing the executive loop 600, determines that a cmd_q_rq (command queue request) flag is true, indicating that a command was loaded in the command queue in task 607, and that the tx__buf__bsy (transmit buffer busy) flag is false, the microcontroller 401 then moves through path 656 to a "Get CMD from Queue" task 605. In task 605, the microcontroller 401 retrieves a command from the command queue and then moves through path 651 to the Decode CMD task 602 as described above.

When the microcontroller 401, in processing the executive loop 600, determines that an attn_resp_rq (attention response request) flag, usr_pkt_resp_rq (user packet response request) flag, or attn_cmd_rq (attention command request) flag is true, and that the tx_buf_actv flag is false, it then moves through paths 658, 659, or 660, respectively, to a PKT pre-build task 608. In the PKT pre-build task 608, the microcontroller 401 prepares context for the respective activity flag and then moves through path 653 to the Build PKT task 604 described above. If the attn_resp_rq flag is set, the microcontroller 401 will enable the STC 400 to operate as a Responder and return a status response packet in response to receiving the attention command packet from another device connected to bus 150 as Commander. If the usr_pkt_resp_rq flag is set, the microcontroller 401 will enable the STC 400 to operate as a Responder and return a status response packet in response to receiving the SEND USER PACKET command packet from another device connected to bus 150 as Commander. If the attn_cmd_rq flag is set, the microcontroller 401 will enable the STC 400 to operate as a Commander and transmit the attention command to the next device address in the poll list.

When a xmt_done (transmit done) flag is set, conditioned by a transmitter state machine 848 (shown in FIG. 8) to indicate that a packet transfer has been completed, the microcontroller 401, processing the executive loop 600, move through path 753 to a task 712 within a "xmt_done xmt_st" (transmit done transmit state) task 710 shown in FIG. 7. In task 712, the microcontroller 401 resets the xmt_done flag, and then moves through path 754 to a Commander decision task 713 to determine whether the STD is operating as Commander or Responder. If the microcontroller 401 determines in task 713 that the STC 400 is a Commander, it moves through path 755 to a tx_buf_stat (transmit buffer status) decision task 714 to determine the status of a tx_buf_stat (transmit buffer status) flag. If the microcontroller 401 determines in task 714 that the tx_buf_stat flag is false, indicating that the packet was transmitted without error, the microcontroller 401 moves through path 756 to a "Wait for Response" task 715. In task 715, microcontroller 401 prepares context in waiting for the status response packet which is expected in response to the just-transmitted packet, and then returns over path 655 to the executive loop 600.

Returning to task 714, if the microcontroller 401 determines in that task that the tx_buf_stat (transmit buffer status) flag is true, indicating that a transmission error occurred, it then moves through path 757 to the retry_err (retry error) decision task 716. If the microcontroller 401 determines in task 716 that a retry_err (retry error) flag is true, indicating an error in connection with an retry attempt to transmit a packet, it moves along path 759 to an "Abort xmt_pkt" task 719, in which it aborts execution of the command function associated with transmission of the packet, and queues an error status indication for eventual loading into the memory 403, for use by the handler 1400. Following task 719, the microcontroller 401 moves over path 655 back to the executive loop 600.

Returning to task 716, if the microcontroller 401 determines in that task that the retry_err flag is false, it moves along path 758 to a "Retry Error" task 717. In task 717, the microcontroller 401 prepares context to perform a transmission retry after a predetermined delay period, as determined by the timer0 timer. Following task 717, the microcontroller 401 moves through path 655 back to the executive loop 600.

Returning to decision task 713, if the microcontroller 401 determines that its STC 400 is a Responder, it moves along path 760 to a "expect no response" task 720, in which it prepares itself not to expect a response packet. The microcontroller 401 then moves along path 655 back to the executive loop 600.

When the microcontroller 401, when processing the executive loop 600, determines that the timer0 expires, it moves through 661 to a "Timer0 time-out" decision task 609. In task 609, the microcontroller 401 determines a "type" for the time-out. If the microcontroller 401 determines in task 609 that the time-out is of a xmt_st Retry (transmit state retry) delay type, it moves along path 750 to the xmt_pkt task 701 as described above, to attempt to re-transmit a packet for which a transmission error had previously occurred. If the microcontroller 401 determines in task 609 that the time-out is of an Expect_resp (expect response) type, which will be the case if its STC 400, operating as a Commander, did not receive an expected status response packet from another device operating as Responder within a predetermined time-out period, it (that is, the microcontroller 401) moves along path 664 to a task 610, in which it sets an error status type indication. Following task 610, the microcontroller 401 moves along path 753 to the "xmt_done xmt_st" task 710 described above.

When the microcontroller 401, when processing the executive loop 600, determines that a stat_to_csa flag is true, it moves along path 662 to a "Dequeue Status" task 611. In processing task 611, the microcontroller 401 dequeues a status indication for storage in the memory 403. Following task 611, the microcontroller 401 moves along path 663 to a "Fire st_stat_int" task 612, in which it asserts the ST_STAT_INT interrupt signal on line 451 (FIG. 4) to indicate that a status indication has been loaded in the memory 403.

FIG. 8 is a flowchart for the bus state machine which controls transmission and reception of packets over the bus 150, including a reset state 801, an idle state 802, a transmitter state machine 848, and a receiver state machine 849. In FIG. 8, there are two types of operations, namely "state" and "task." A "state" represents a suspension in operation of states 801 and 802 and the respective transmitter and receiver state machines 848 and 849, until a particular condition is detected, after which the states sequence to the next state or task subsequent operation. On the other hand, a "task" represents an operation that continues unconditionally to a subsequent operation. delete? The s1 sta register within microcontroller 401 provides a specific interrupt status as per the aforementioned 83C652 specification for each type of STbus packet 500 framing state and error condition. The firmware state machine handles the s1sta interrupt in states 802, 803, 804, 805, and 822, and then moves on to a subsequent state or task as shown by the interconnects. For reference purposes the contents of the interrupt status (s1 sta) register is shown alongside an interconnect. The following text describes the firmware state machine from a task or state's view-point.

Initially, the reset signal 698 (FIG. 6) enables the bus state machine to enter a reset state 801. Following the reset state 801, when the FIG. 8 is a flowchart for a state machine which controls transmission and reception of packets over the bus 150 executes the Init_cmd (initialization command) task 606 in response to the STC INIT command (FIG. 6), the bus state machine moves along path 850 to the idle_st state 802.

From the idle_st state 802, the microcontroller 401 enables a serial communication port for bus 150 and performs the STC INIT command function. If the microcontroller 401 completes the command successfully, the bus state machine will remain in this state 802 and place itself into an Initialized mode. On the other hand, if the microcontroller 401 does not complete the STC INIT command successfully, the bus state machine will return along path 851 back to the firmware reset state 801. In the Initialized mode, the bus state machine may move along path 853 to the transmitter state machine 848 to transmit a packet, to the receiver state machine 849 to receive a packet, or through 852 back to state 802 to handle invalid status faults, respectively.

From the idle state 802, the bus state machine sequences to the transmitter state machine 848 when the tx_start_st (transmit start state) flag is set during execution of task 705 (FIG. 7). In response to setting of the tx_start_st flag, the transmitter state machine 848 enters the tx_start_st state 803. Subsequent to entering the tx_start_st state 803 the transmitter state machine 848 sets an "i2c_st" variable equal to "tx_start_st." In the tx_start_st state 803, the transmitter state machine 848 verifies that the bus 150 is available for output transmission and handles several conditions. If an invalid status fault is detected, the transmitter state machine 848 sequences along path 854 back to the tx_start_state 803. On the other hand, if a bus receiver for bus 150 detects a packet 500 containing a destination address for STC 400 in sub-field 511, the transmitter state machine 848 will sequence along path 871 to the receiver state machine 849 to enable reception of the packet 500.

If the transmitter state machine 848 determines in the tx_start_st (transmit start) state 803 that neither condition exists, it will determine that the bus 150 is available and enable transmission of the start bit for the framing state 501 (FIG. 5) and sequence along path 855 to a tx_dadr_st (transmit destination address) state 804. On the other hand, if the transmitter state machine 848 determines in the state 803 that a timer0 established during processing of the xmit pkt (transmit packet) task 701 has timed out, it will sequence along a path 857 to an tx_error (transmit error) task 808. In the task 808, the transmitter state machine 848 conditions the tx_buf_stat transmit buffer status flag to provide a status indication that indicates that a transmission error occurred. In the tx_dadr_st state 804, the transmitter state machine 848 loads an S1DAT register (not separately shown) with a destination address and waits for it to be transmitted over the bus 150. In state 804, the transmitter state machine 848 handles several conditions. If the bus transmitter loses arbitration for the bus 150, the transmitter state machine 848 will sequence over path 856 back to state 803, and re-arbitrate for the bus 150 in that step 803. If a bus receiver for bus 150 detects a packet 500 containing a destination address for STC 400 in sub-field 511, the transmitter state machine 848 will sequence along path 859 to the receiver state machine 849 to enable reception of the packet 500. In addition, if a tx_timeout (transmit time-out) or tx_error (transmit error) occurs, the transmitter state machine 848 sequences along a path 860 to a tx_error task 808 to process the error. A tx_error occurs when a state detects an invalid status, which generally indicates a framing error as described above.

On the other hand, if the bus transmitter successfully transmits the destination address over bus 150, the transmitter state machine will sequence along path 858 to a tx_data_st (transmit data) state 805. In the tx_data_st state 805, the transmitter state machine 848 loads the S1DAT register with a source address for the source address framing state 520, after which it will wait for the source address to be transmitted. The tx_data_st state 805 is also use to handle the transmission for of data for the subsequent framing states 530 through 560. From this state, the transmitter state machine 848 may return to state 803 over path 856 if the bus transmitter loses arbitration for bus 150; in state 803, the transmitter state machine 848 will re-arbitrate for the bus. The transmitter state machine 848 may sequence to a "Load next data" task 806 over path 861 when the bus transmitter successfully sends a data byte and determines that more data is to be transmitted; in the "Load next data" task 806, the transmitter state machine 848 loads the S1DAT register with a next data byte that satisfies framing states 530 through 560, and then returns overpath 862 to state 805. From state 805, the transmitter state machine may also sequence to a state 807 over path 863 to condition the tx_buf_stat (transmit buffer status) flag, when the transmitter has successfully sent the Checksum data byte (framing state 560) and prepares to terminate the packet transmission. In processing task 807, the transmitter state machine 848 sets an internal status indication to indicate that the packet 500 had been transmitted without error. Following task 807, the transmitter state machine moves over path 864 to the tx_stop task 809.

The transmitter state machine 848 uses the tx_stop task 809 to terminate transmission of a packet 500 with the P-bit framing state 503, to set the xmt_done flag (transmit done flag) which will subsequently be used by the microcontroller 401 during processing of the executive loop 600 (reference path 753, FIG. 6) and to set the "i2c_st" variable equal to idle_st. Following processing of task 809, the transmitter state machine sequences along path 883 to return to the idle-st 802 of the bus state machine.

From the idle state 802, the bus state machine (FIG. 8) can enter the receiver state machine 849 along path 870 if the bus receiver detects a destination address framing state 510 in sub-field 511 contains either the destination address for the STC 400. As noted above, the receiver state machine 849, may also be entered along paths 871 and 859 from states 803 and 804 of the transmitter state machine 848 under the same conditions. The paths 870, 871 and 859 all lead to a rx_rcv_myadr task (receive my address) task 820. In the task 820, the receiver state machine enables a timer1 for rx_time-outs (receive time-outs), and sets a rx_buf_bsy(receive buffer busy) flag, which is monitored during processing of the xmt_pkt task 701 (FIG. 7). Thereafter, the receiver state machine 849 sequences along path 872 to a rx_data_st (receive data) state 822.

In the rx_data_st state 822, the receiver state machine 849 verifies that either data or frame-stop bit (P-bit framing state 503) has been received. From this state 822, the receiver state machine moves to a task 823 over a path 873 when the bus receiver successfully receives a data byte originating from framing states 520 through 560. In task 823, the receiver state machine 849 transfers the data byte from the S1DAT register to a rx_buf receive buffer in the STC microcontroller 401 (not separately shown), and then sequences along a path 874 back to rx_data st_state 822.

From the rx_data_st state 822, the receiver state machine 849 can also sequence over a path 876 to an rx_error task 829. This will occur when the receiver state machine 849 detects either a framing error or an rx_timeout error, the rx_timeout error occurring if the timer1 established during processing of task 820 times out. An rx_error is the result of a framing error, which occurs when a packet transfer begins with the S-bit framing state 501 but fails to satisfy the rest of the packet framing protocol aforementioned. An rx_timeout occurs when any one of the packet framing states fail to complete within the time period determined by the timer1 timer. An rx_error, like the aforementioned tx_error, occurs when a specific state detects an invalid s1 sta status, which generally indicates a framing error as previously described. In processing the rx_error task 829, the receiver state machine 849 terminates reception of a packet reception with the P-bit framing state 503 and loads an error status indication into the status queue (stat_q), sets the stat_to_csa flag, which enables the microcontroller 401 to load the status indication in the memory 403. In addition, in processing the rx_error task 829, the receiver state machine 849 resets the rx_buf_bsy (receive buffer busy) flag 821. Following the rx_error task 829, the receiver state machine 849 sequences along path 879 to task 830.

In addition, from the rx_data_st state 822, the receiver state machine 849 can also sequence over a path 875 to an rx_stop (receiver stop) task 824 when the bus receiver detects the P-bit framing state 503. In processing task 824, the receiver state machine 849 releases bus 150 for use by other devices. Following step 824, the receiver state machine 849 sequences along a path 877 to a task 825.

In processing task 825, the receiver state machine 849 validates the information loaded in the microcontroller's receive buffer rx_buf for proper format and checksum. The receiver state machine will sequence from task 825 over path 876 to the rx_error task if the receiver state machine 849 detects an error. On the other hand, if the receiver state machine determines that the format for the received packet is proper and that the checksum of the received packet conforms to the checksum in the packet, it will determine the type of packet that was received and sequence to one of task 826, 827, or 828 based on that determination.

Following task 825, the receiver state machine 849 can sequence over paths 882, 880, or 878 based on whether the type of packet that was received is a User packet command, an Attention command, or an expected status response packet, respectively. In processing tasks 827 and 828, the receiver state machine 849 sets respective att_resp_rq (attention response request) and usr_pkt_resp_rq (user packet response request) flags, which are used in controlling the microcontroller 401 during processing of executive loop 600, as described above in connection with FIG. 6. These flags indicate that either a user packet command or an attention command, respectively, has been received. Following tasks 827 or 828, the receiver state machine sequences along a path 879 to a task 830.

The receiver state machine 849 will sequence from task 825 to task 826 if the received packet is a response to a command packet previously transmitted by the STC 400. In that case, the receiver state machine 849 uses task 826 to terminate a currently active command transfer function, generate a status indication to be loaded in the memory 403 for the handler 1400, and set the stat_to_csa flag. The microcontroller 401 will use the stat_to_csa flag in processing of the executive loop 600 as described above in connection with FIG. 6. In addition, the receiver state machine 849 also resets the appropriate activity flags, including the tx_buf_actv (transmit buffer active), retry_err (retry error) flags, and then sequences along path 879 to task 830.

The receiver state machine uses task 830 to determine the next state for the bus state machine. If the receiver state machine 849 determines that the tx_buf_actv flag is false, which will be the case if the STC 400 does not have a packet to transmit, it returns to the idle state by sequencing over path 881 to a task 831 from there over a path 883 to the idle_st state 802. On the other hand, if the tx_buf_actv flag is true, which will be the case if the STD does have a packet to transmit, the receiver state machine 849 sequences over path 882 to task 832 and from that task along path 884 to the tx_start_st state 803 of the transmitter state machine 848.

Figure 9:
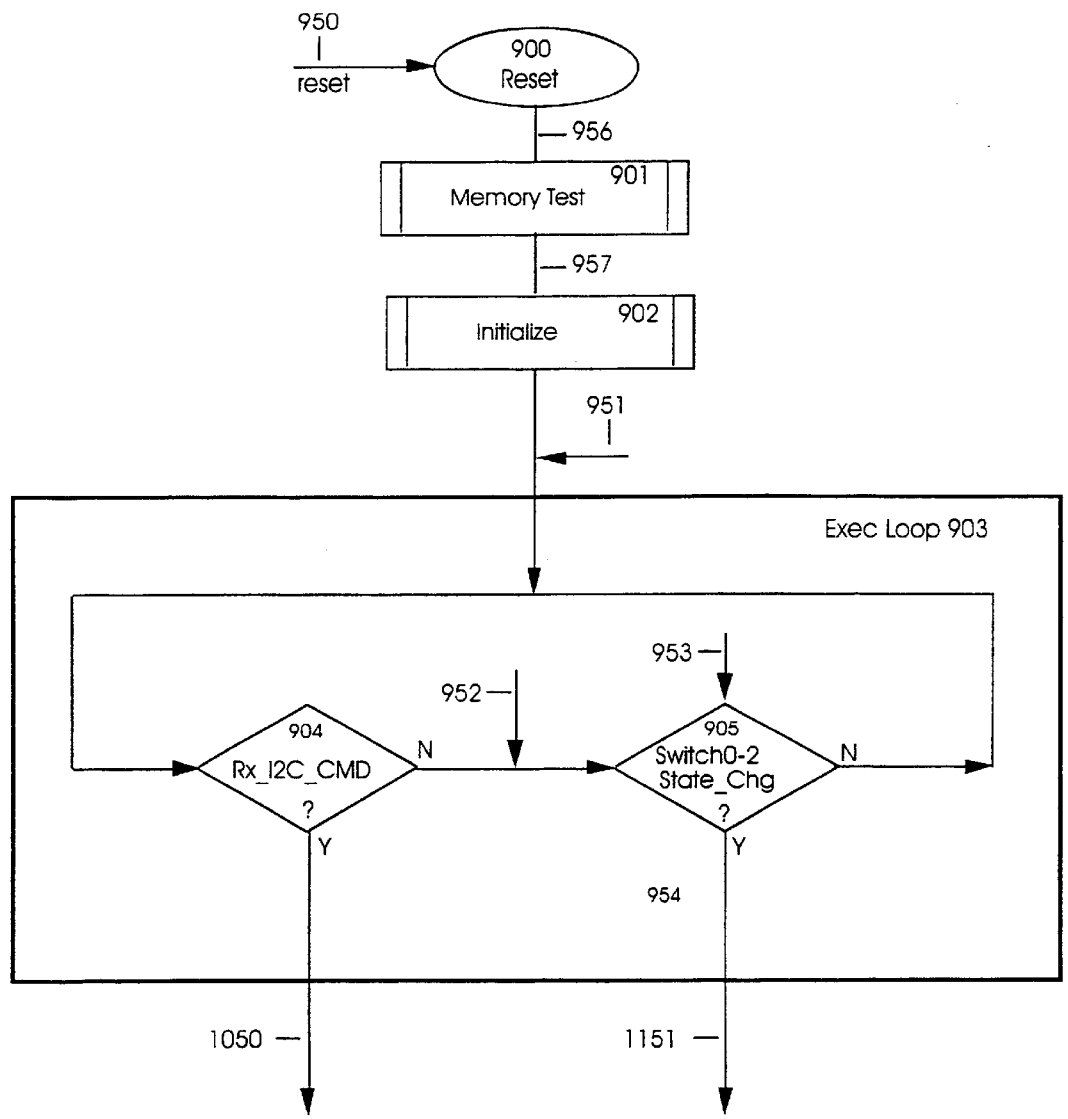
FIGS. 9 through 13 are flowcharts depicting operations performed by a microcontroller controlling a device controller (STD)
Figure 10:
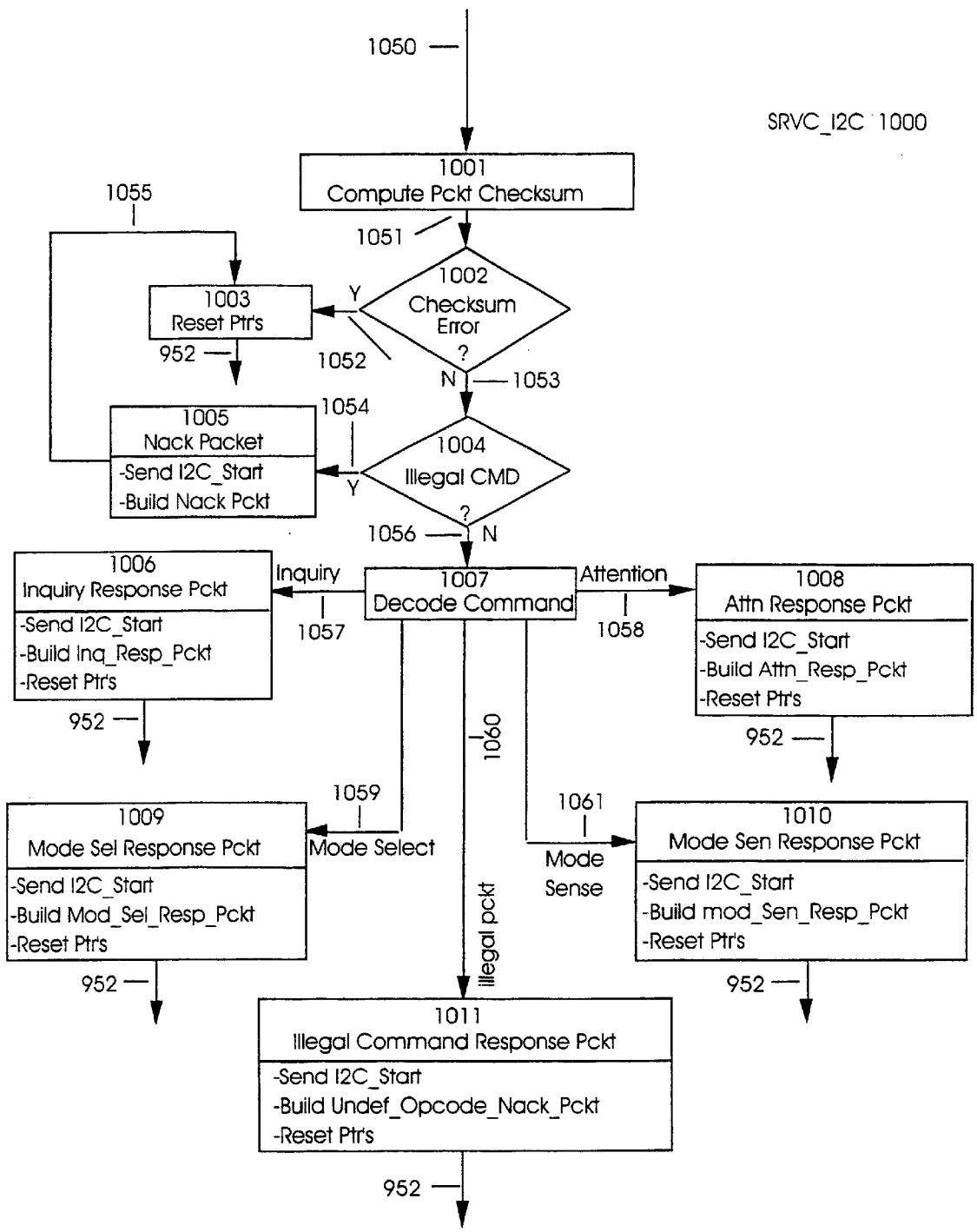
Figure 11:
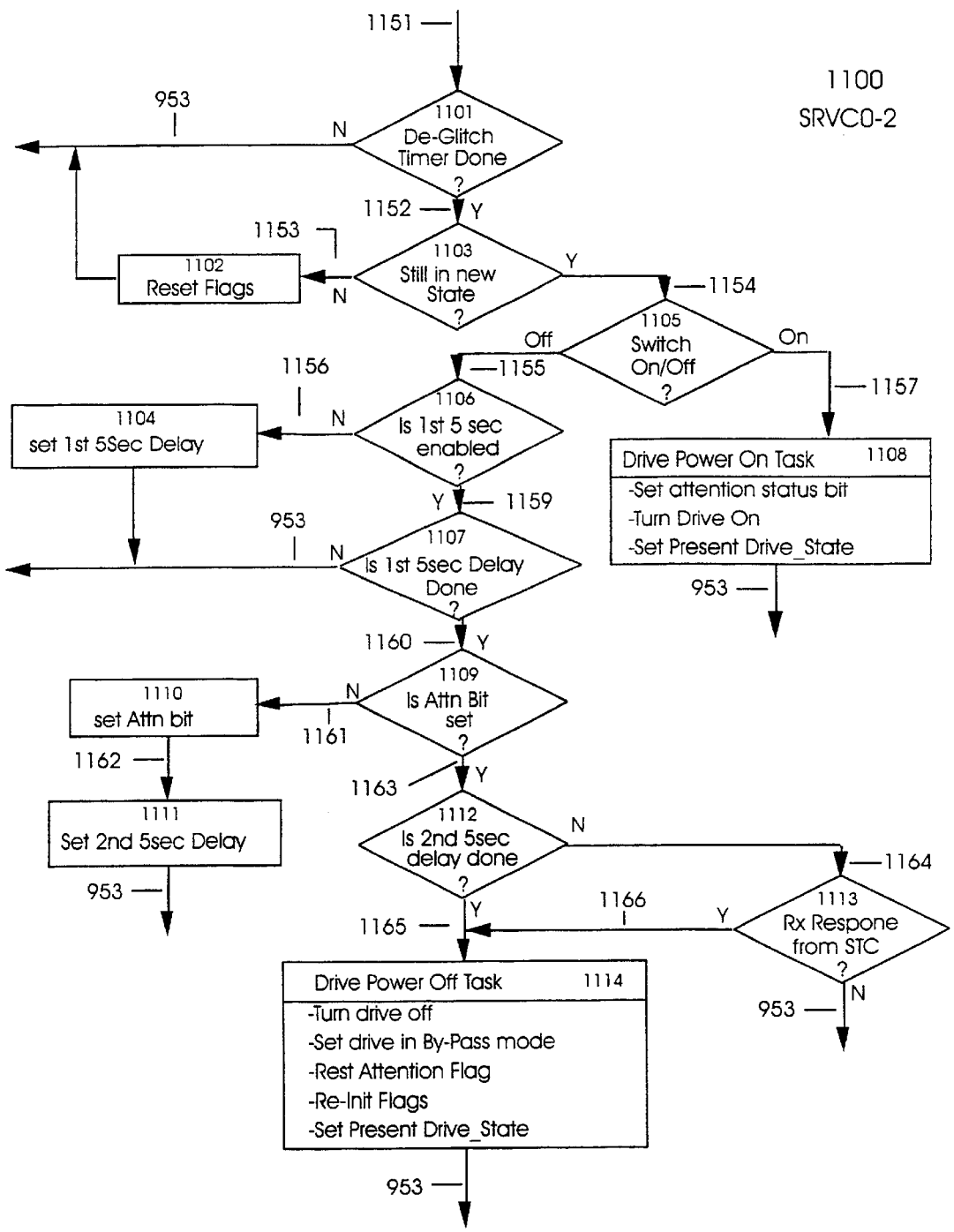
Figure 12:
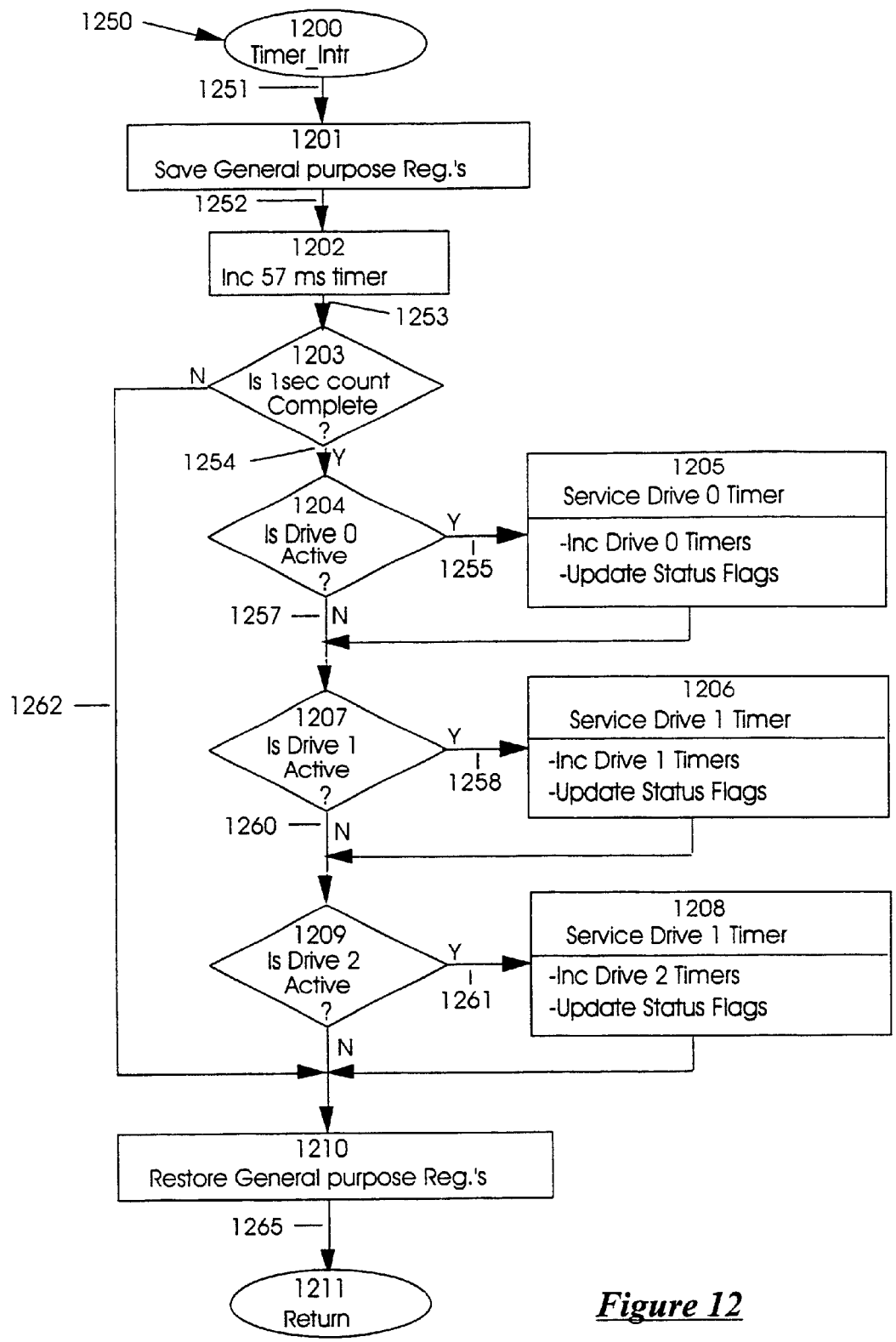
Figure 13A:
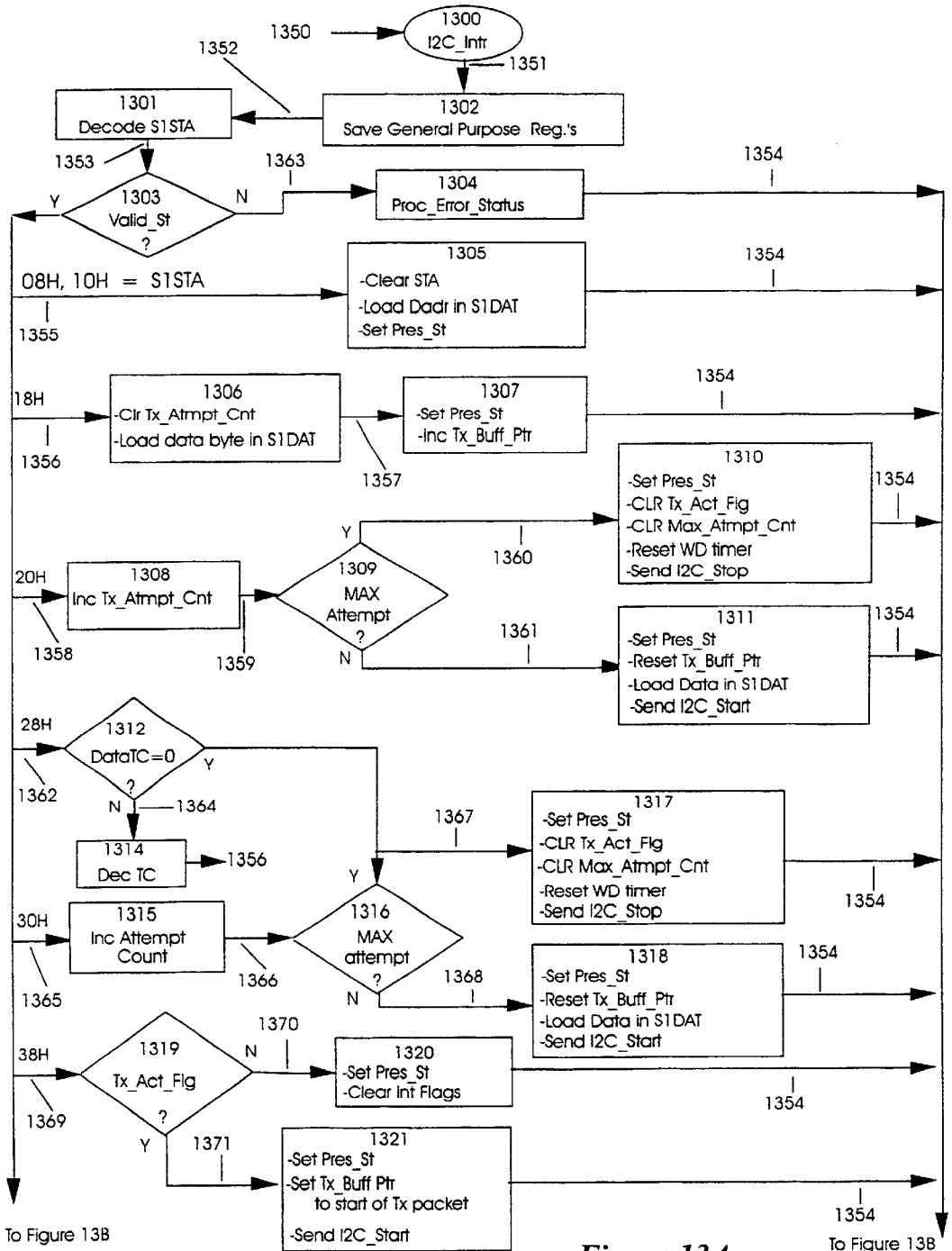
Figure 13B:
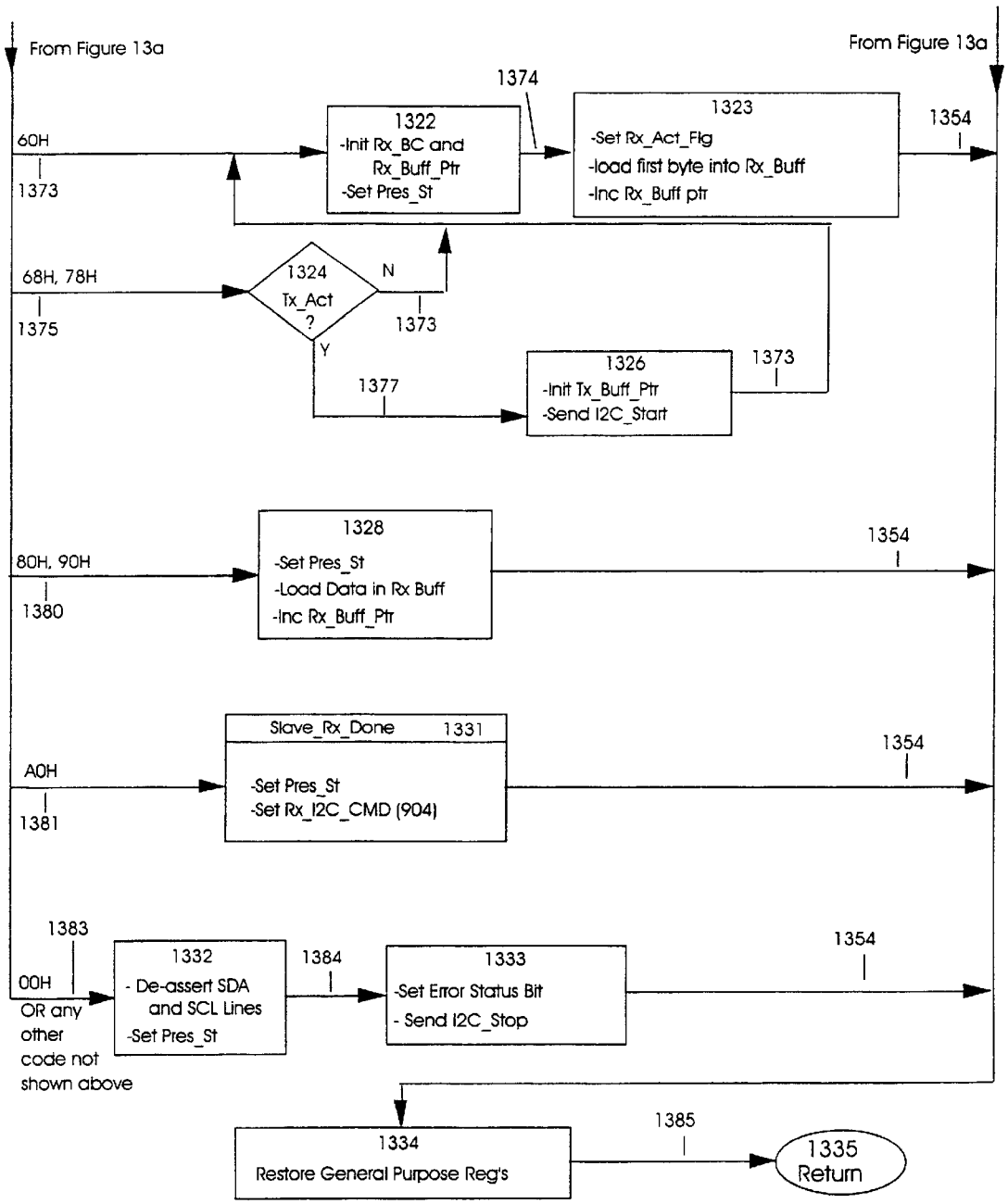

The details of operations performed by the microcontroller 301 of STD 300 (FIG. 3) will now be described in connection with FIGS. 9 through 13. FIG. 9 depicts a flowchart of a power-up reset and executive loop 903 executed by the microcontroller 301. FIG. 10 depicts a flowchart for a subroutine task 1000 executed by microcontroller 301 in which command packets received from an STC 400 are processed, and in which response packets are generated for transmission over bus 150 to the STC 400. FIG. 11 depicts a flowchart for a task 1100 in which the microcontroller 301 processes state changes in switches 0, 1, and 2 of the drive power switches 302. FIG. 12 depicts a flowchart for a timer interrupt subroutine 1200 executed by the microcontroller 301. FIG. 13 depicts a flowchart of an interrupt subroutine 1300 that is processed by the microcontroller 301 when a single byte is received or transmitted by the interface of the STD microcontroller 301 to bus 150. In the following, it will be assumed that the microcontroller 301 is in the left-hand STD 300 as shown in FIG. 2, which controls the drive-port bypass switches of drive modules 202–204 and Fibre Channel configuration switches 201, 205 and 206; it will be appreciated that corresponding operations will be performed by the microcontroller 301 of the right-hand STD 300.

FIG. 9 depicts a flowchart of a power-up reset and executive loop 903 processed by the microcontroller 301. Initially, a reset signal 950 is generated by a circuit (not separately shown) of the STD 300 that enables the microcontroller 301 to enter a reset state 900, and which also serves to resets all components of the STD 300 to respective predetermined states The microcontroller 301 then sequences along a path 956 to a memory test 901 subroutine in which an internal memory test is performed on the STD Microcontroller 301. If the memory test passes, the microcontroller 301 sequences along path 957 to an initialize subroutine 902. If the memory test fails, the microcontroller 301 does not exit subroutine 901, which will serve to inhibit further initialization, but which will enable the microcontroller 301 to provide an error status indication by drive status LEDs 306.

In processing the initialize subroutine 902, the microcontroller 301 sets up internal states and status flags as described below, and checks the settings of the drive power switches 302 for drive modules 202, 203, and 204, and then provides power only to those drives that have their switch set to the On position. In subroutine 902, the microcontroller 301 conditions the drive-port by-pass switches 213 and 215 for FC loop-A and FC loop-B ports 214 and 216, into pass-thru mode for drive modules which are powered on, and into bypass mode for drive modules which are powered-off. Similarly, the initialize subroutine 902 enables the microcontroller 301 to condition the configuration switches 201, 205 and 206 to the pass-thru mode. After the microcontroller 301 has completed processing of the initialize subroutine 902, it sequences along a path 951 to an executive loop 903. At this point the STD 300 is now ready to accept command packets from the bus 150 and to monitor state changes in the conditions of the drive power switches 302.

In processing the executive loop 903, the microcontroller 301 checks and services two decision tasks 904 and 905. In processing the decision task 904, the microcontroller 301 determines whether a packet including a command to be executed by it has been received, and in processing decision task 905, the microcontroller 301 determines whether a change has occurred in the condition of a drive power switch 302. When the microcontroller 301 makes a positive determination in decision task 904 or task 905, it executes a subroutine call to a respective task handler. That is, if the microcontroller 301 makes a positive determination in task 904, it will process the subroutine whose flowchart is depicted in FIG. 10. On the other hand, if the microcontroller 301 makes a positive determination in task 905, it will process the subroutine whose flowchart is depicted in FIG. 11.

More specifically, when the microcontroller 301 makes a positive determination in processing task 904, indicating a command has been received, the microcontroller 301 sequences along a path 1050 to execute a subroutine call to an SRVC_I2C bus service subroutine 1000 shown in FIG. 10. This will occur when a Rx_I2C_CMD (receive command) flag is set during processing of a Slave_Rx_Done (slave receive done) subroutine shown in FIG. 13, if a received packet contains a command for execution. After processing subroutine 1000, the microcontroller 301 returns return along a path 952 to the executive loop 903. If the microcontroller 301 makes a negative determination during processing of the Rx_I2C_CMD decision task 904, it sequences along path 952 to decision task 905. Task 905 actually comprises three separate decision tasks each servicing a drive power switch for a respective one of the drive modules 202–204 in the drive power switches 302. If the microcontroller 301 detects a switch state change for one of the drive power switches, it sequences along path 1151 to execute a subroutine call to an SRVC_0-2 subroutine task 1100, shown in FIG. 11, for the respective switch. After processing the task 1100 for one switch, the microcontroller 301 returns along a path 953 to task 905 to service the next switch. The switches within DRV PWR Switches 302 are checked and serviced by the microcontroller 301 in order of switches for the successive drive modules 202–204. When the microcontroller 301 completes processing of task 905 for the switch associated with drive module 204, it then sequences along path 951 to continue the executive loop 903.

FIG. 10 depicts a flowchart for subroutine task 1000, in which command packets received from an STC 400 are processed, and in which response packets are generated for transmission over bus 150 to the STC 400. The microcontroller 301 enters task 1000 by a subroutine call through path 1050 from the executive loop 903, as shown in FIG. 9. With reference to FIG. 10, in task 1000, the microcontroller 301 initially performs a "Compute Pckt Checksum" task 1001 to compute a checksum for the received packet and store the result into a temporary storage register (not separately shown) within microcontroller 301. The microcontroller 301 then sequences along a path 1051 to a "checksum Error" decision task 1002, in which it determines whether the checksum of the received packet (reference framing state 560) differs from the checksum in task 1001. If the microcontroller 301 makes a positive determination in task 1002, it sequences along a path 1052 to a "Reset Ptr's" task 1003, in which the packet is discarded and resets data structures established therefor are reset. Following the "Reset Ptr's" 1003 task, the microcontroller 301 sequences along path 952 to return to the executive loop 903.

If, on the other hand, the microcontroller 301 makes a negative determination in task 1002, the checksum of the received packet matches the computed checksum. In that case, the microcontroller 301 sequences along path 1053 to an "Illegal CMD" decision task 1004, in which it determines whether the received packet contains an illegal command. If the microcontroller 301 makes a positive determination in decision task 1004, it sequences along path 1054 to a "Nack Packet" task 1005. In the "Nack Packet" task, the microcontroller 301 generates a negative acknowledgment packet that will be sent to the STC 400. Following task 1005, the microcontroller 301 sequences along path 1055 to the "Reset Ptr's" task 1003 as described above.

If the microcontroller 301 makes a negative determination in the "Illegal CMD" decision task 1004, it sequences along a path 1056 to a "Decode Command" task 1007. In task 1007, the microcontroller 301 decodes the Opcode field from framing state 530 which in turn causes the firmware to move to one of five command execution tasks, as described above. In executing a command, the microcontroller 301 generates a status response packet appropriate for the respective command, generates and appends a checksum, and then provides a Bus Start to the bus interface of microcontroller 301 which starts arbitrating for the bus 150, as described below in connection with FIG. 13. If the microcontroller 301 determines that the command is an Inquiry command, it sequences along a path 1057 to an "Inquiry Resp Packet" task 1006. After processing task 1006, the microcontroller 301 returns along path 952 to the executive loop 903. If the microcontroller 301 determines that the command is a Mode Select command, it sequences along a path 1059 and executes a "Mode Select Resp Packet" task 1009. After processing task 1009, the microcontroller 301 sequences along path 952 to the executive loop 903. If the microcontroller 301 determines that the command is in an illegal packet, it sequences along a path 1060 to an "Illegal Command resp packet" task 1011. After processing task 1011, the microcontroller 301 returns along path 952 to the executive loop 903. If the microcontroller 301 determines that the command is a Mode Sense command, it sequences along a path 1061 to a "Mode Sen Resp Packet" task 1010. After processing task 1010, the microcontroller 301 returns along path 952 to the executive loop 903. Finally, if the microcontroller 301 determines that the command is an Attention command, it sequences along a path 1058 to a "Send Attn Resp Packet" task 1008. After processing task 1008, the microcontroller 301 returns along a path 952 to the executive loop 903.

FIG. 11 depicts a flowchart for a task 1100, in which state changes in switches 0, 1, and 2 of the drive power switches 302 are processed. Task 1100 essentially represents three independent, but functionally identical subroutines, each servicing a respective switch 0, 1, or 2 in the drive power switches 302 for respective drive modules 202–204. The task 1100 enables the microcontroller 301 to detect a switch state change, provide a switch debouncing filter, and provide a time delay that permits an operator to change their mind and return the switch position to its previous condition. If the switch remains in its new state following a predetermined time delay, the microcontroller 301 controls the power to the respective drive module 202–204 and provides an Attention Status for the STC 400, in response to a packet including an ATTN_POLL_START command. When a switch changes state from "On" to "Off" or from "Off" to "On", the microcontroller 301 proceeds to turn the drive module's power "Off" or "On", respectively, and updates the drive module's status structures (not separately shown). The microcontroller 301 processes task 1100 as background task until an associated timer expires.

The following describes the operations performed by the microcontroller 301 in connection with the drive power switch for drive module 202; operations performed in connection with drive power switches for the other drive modules 203 and 204 are similar. The microcontroller 301 enters task 1100 upon the execution of a subroutine call in task 905 from the executive loop 903 through path 1151. Initially, the microcontroller 301 will execute a the "De-Glitch Timer" decision task 1101. Task 1101 provides a de-glitch time delay for de-bouncing the switch. Prior to the end of the de-glitch time delay, the microcontroller 301 will return to task 905, and from there return to the de-glitch decision task 1101. The microcontroller 301 will repeat these operations through a plurality of iterations, until it determines, in task 905, that the switch had returned to its previous condition, or, in the de-glitch decision task 1101, that the de-glitch time delay had timed out. If the microcontroller 301 determines in de-glitch decision task 1101 that the de-glitch time delay had timed out, it will sequence to a "Still in New State" decision task 1103. If the microcontroller 301 makes a negative determination in decision task 1103, which will be the case if the switch did not change state, the microcontroller 301 sequences along a path 1153 to a "Reset Flags" task 1102 in which various flags may be reset, and returns to task 905 along path 953.

If, on the other hand, the microcontroller 301 makes a positive determination in task 1103, it sequences along a path 1154 to a"Switch On/Off" decision task 1105. Indecision task 1105 the microcontroller 301 determines whether the new setting of the switch the "On" position or the "Off" position. If the microcontroller 301 determines that the setting is the "On" position, it sequences along a path 1157 to execute a "Drive Power On Task" 1108. In processing task 1108, the microcontroller 301 sets an attention status bit, which is returned to the STC 400 in a response packet. The microcontroller 301 proceeds to power-on the drive, and then returns along path 953 to task 905. The drive module 202 will be powered-on with the drive-port bypass switches 213 and 215 in the bypass mode so not to disturb the FC loops 160 and 170. After receiving the Attention Status bit, the STC 400 may thereafter change the modes of the respective drive-port bypass switches by transmitting packets including appropriate STD DS Mode Select commands.

If the microcontroller 301 determines, in processing the decision task 1105, that the switch setting is "Off," it sequences along a path 1155 to a "Is 1st 5 sec enabled" decision task 1106. The decision task 1106 is used to enable a five second timer, which will allow an operator time to change his or her mind and reverse the switch back to the "On" position. This is useful, for example, if the operator unintentionally changed the condition of the drive power switch. If the microcontroller 301 makes a negative determination in decision task 1106, it sequences along path 1156 to a "set 1st 5 sec Delay" task 1104 that starts a timer for a first-five second delay. The microcontroller 301 then returns along path 953 to task 905.

If, on the other hand, the microcontroller 301 makes a positive determination in decision task 1106, it sequences along a path 1159 to an "Is 1st 5 sec Delay Done" decision task 1107. In decision task 1107, the microcontroller 301 determines whether first five second timer has expired, and, if not, returns to task 905 (FIG. 9) along path 953. If the switch changes state during this period, then, when the microcontroller 301 returns to through task 905 and 1101 to task 1103, it will return to task 905 along path 1153 and through task 1102.

On the other hand, if the microcontroller 301 makes a positive determination in decision task 1107, it sequences along a path 1160 to an "Is Attn Bit Set" decision task 1109. In decision task 1109 checks to see if an Attention Bit has been sent in a packet to the STC 400. If the microcontroller 301 makes a negative determination in decision task 1109, it sequences along a path 1161 to a "Set Attn Bit" task 1110, in which it sets an attention bit for the STC 400 to read when it polls the address for the STD 300 associated with the microcontroller 301. The microcontroller 301 then sequences along a path 1162 to execute a "Set 2nd 5 Sec Delay" task 1111. In task 1111, the microcontroller 301 establishes another five second delay timer to allow the handler 1400 time to act on the attention status and take predetermined actions, such as isolating the drive from the Fibre Channel loops 160 and 170 subsequent to powering off the drive module. Following task 1111, the microcontroller 301 returns to task 905 over path 953.

If, on the other hand, the microcontroller 301 makes a positive determination in decision task 1109, it sequences along a path 1163 to execute an "Is 2nd 5 sec delay Done" decision task 1112. If the microcontroller 301 makes a negative determination in decision task 1112 it sequences along a path 1164 to an "Rx Response from STC" decision task 1113. In processing of the Rx Response from STC decision task 1113, the microcontroller 301 determines the condition of an "Rx Response from STC" flag, which controls subsequent operations. The condition of the Rx Response from STC flag, in turn, indicates whether the handler 1400 has enabled the STC 400 to send a "Drive Power Off" Mode Select command in response to the Attention status. The flag is conditionally set by the "Mode Sel Response Pckt" task 1009 (FIG. 10) when it decodes the "Drive Power Off" Mode Select command while the attention status bit is active. The determination made in task 1113 controls whether the microcontroller 301 is to proceed with powering off the drive module before the end of the second five-second time delay. Thus, if the microcontroller 301 makes a positive determination in decision task 1113 it sequences along path 1166 to execute a "Drive Power Off" task 1114. Contrariwise, if the microcontroller 301 makes a negative determination in decision task 1113, it returns from the subroutine through path 953 to task 905. If the microcontroller 301 makes a positive determination in decision task 1112, then the second five-second delay has elapsed and the microcontroller 301 sequences along a path 1165 to execute a task 1114, in which the drive module is powered off, the drive module's Fibre Channel drive-port bypass switches 213 and 215 conditioned into the bypass mode, and related flags are conditioned. Thereafter, the microcontroller 301 returns from the subroutine through path 953 to task 905.

FIG. 12 depicts a flowchart for a timer interrupt subroutine 1200. Under control of the timer interrupt subroutine 1200, the microcontroller 301 establishes and maintains separate one-second timers for each drive module 202, 203, and 204, which are used in connection with processing under control of other tasks. The microcontroller 301 processes subroutine 1200 periodically under control of a hardware timer and interrupt logic (not separately shown) that is located within the STD microcontroller 301. In response to an interrupt from the hardware time and interrupt logic, the microcontroller 301 begins processing the timer interrupt subroutine 1200. Initially, the microcontroller 301 sequences along path 1251 to a "Save General Purpose Reg's" task 1201, in which it saves all of its context registers on a stack (not separately shown) and then sequences along a path 1252 to a "Inc Timer" task 1202. Task 1202 is a free running task that enables the microcontroller 301 to increment a timer cell by a predetermined amount each time the Timer_Intr 1200 is activated. The microcontroller 301 then sequences over a path 1253 to a"Is 1 sec Count Complete" decision task 1203. In decision task 1203, the microcontroller 301 checks if a second time counter has counted out. If the microcontroller 301 makes a negative determination in step 1203, it sequences along a path 1262 to a "Restore General Purpose Reg's" task 1210, which enables the microcontroller 301 to restore the registers saved in task 1201. Following step 1210, the microcontroller 301 processes a Return instruction 1211 that enables a return from the interrupt.

Returning to decision task 1203, if the microcontroller 301 makes a positive determination in that step, it sequences along a path beginning with path 1254 to perform successive drive active decision tasks 1204, 1207 and 1209. If the microcontroller 301 makes a positive determination in connection with a decision task 1204, 1207, and 1209, then it sequences along a respective path 1255, 1258, 1261 to a respective service drive timer task 1205, 1206, 1208. In processing a service drive timer task 1205, 1206, 1208, the microcontroller 301 increments timers enabled by the subroutines that are responsible for servicing the respective drive module 202,204,206, sets relevant status flags. Following task 1208, or task 1209 if the microcontroller 301 makes a negative determination in that step, it will sequence to task 1210 to restore the previously-saved registers and return.

FIG. 13 depicts a flowchart of an interrupt subroutine 1300 that is processed when a single byte is received by the interface of the microcontroller 301 from bus 150 or transmitted over bus 150 by the interface of the microcontroller 301. In the interface subroutine 1300, the microcontroller 301 controls the reception of command packets from and transmission of status response packets to the STC 400. Initially in processing the interrupt subroutine 1300, the microcontroller 301 sequences along a path 1351 to a "Save General Purpose Reg's" task 1302, in which it saves all context registers on a stack memory. The microcontroller 301 then sequences along path 1352 to a"Decode S1STA" task 1301 in which it decodes a status code contained in an S1STA register (which is defined in the I2C specification) which indicates framing state and error conditions for a packet 500 being transmitted or received by the STD 300. The microcontroller 301 sequences along a path 1353 to a "Valid_St" decision task 1303 in which it determines whether the status code contained in the S1STA register is a valid code. If the microcontroller 301 makes a negative determination in task 1303 it sequences along a path 1363 to a "Proc_Error_Status" task 1304, in which it processes the error condition and halts further packet transmission, if the STD 300 is transmitting a packet 500, or aborts further packet reception, if the STD is receiving a packet 500. The microcontroller 301 then sequences along a path 1354 to a "Restore General Purpose Reg's" task 1334, in which it restores the registers which were saved in task 1302. Following task 1334, the microcontroller 301 sequences along a path 1385 to a Return instruction 1335, which enables the microcontroller 301 to return from the interrupt.

With reference to decision task 1303, if the microcontroller 301 makes a positive determination in that task, which will be the case if the status code in the S1STA register is valid, then the microcontroller 301 sequences along one of a number of paths 1355, 1356, 1358, 1362, 1365, 1369, 1373, 1375, 1380, 1381, or 1383 as determined by the status code. If the microcontroller 301 determines that the status code in the S1STA register indicating that the S-bit framing state 501 occurred, it (that is, the microcontroller 301) sequences along a path 1355 to a task 1305 to clear an STA bit, load an S1DAT data register with the destination address for the framing state 510, and set the present state. The microcontroller 301 then sequences along the path 1354 to task 1334 to restore the registers and return from interrupt processing as described above.

If the microcontroller 301 determines that the status code in the S1STA indicates that the STD 300 has successfully transmitted the Dadr (destination address) frame state 510 for a packet 500, which includes the destination address for the packet, it sequences along a moves through path 1356 to a task 1306 that clears an Attempt Counter (not separately shown) and loads the S1DAT register with either the source address for use in the Sadr framing state 520, data for use in framing states 520–550, or a checksum for use in framing state 560, depending on the framing state to be transmitted next. The Attempt Counter identifies the number of times the STD 300 has attempted to retransmit a packet if a packet transmission fault occurs, and is incremented for each attempt. Since the microcontroller 301 stores data for the successive framing states 510–560 in successive locations in its internal memory prior to being transferred to the S1DAT register for transmission, following task 1306, the microcontroller 301 sequences along a path 1357 to a task 1307, in which it updates the present state and increments a transmit buffer pointer for the packet to be transmitted to point to the next location in its internal memory. The microcontroller 301 then sequences along path 1354 to task 1334 to restore the registers and return from the interrupt.

If the microcontroller 301 determines that the status code in the S1STA register indicates that the destination address in the Dadr framing state 510 was not acknowledged, the microcontroller 301 sequences along a path 1358 to a task 1308, in which it increments the Transmit Attempt counter. Following task 1308, the microcontroller 301 sequences along a path 1359 to a "Max Attempt" decision task 1309, in which it determines whether the value provided by the Transmit Attempt counter corresponds to a maximum transmit account value. If the microcontroller 301 makes a positive determination in decision task 1309, it sequences along a path 1360 to a task 1310, in which it updates its present state, clears a Tx_Act_Flg (transmit active flag), the maximum attempt count value, resets a watch dog timer, and sets an STO bit, which enables an stop sequence to be issued to the bus 150. The microcontroller 301 then sequences along path 1354 to task 1334 to restore the registers and return from the interrupt.

Returning to decision task 1309, if the microcontroller 301 makes a negative determination in that step, which will occur if the value provided by the Transmit Attempt counter does not correspond to a maximum transmit account value, then it sequences along a path 1361 to execute a task 1311. In task 1311, the microcontroller 301 updates the present state, and re-transmits the same data again by resetting the transmit buffer pointer, loading the S1DAT register with data pointed to by the transmit buffer pointer, and issuing a bus transmit start sequence. The microcontroller 301 then sequences along path 1354 to task 1334 to restore the registers and return from the interrupt.

If the microcontroller 301 determines that the status code in the S1STA register indicates that a data byte has been successfully transmitted over bus 150, it sequences along a path 1362 to a decision task 1312, in which it determines whether a current byte count equals to zero. If the microcontroller 301 makes a positive determination in decision task 1312, the STD 300 has transmitted the entire packet, in which case the microcontroller 301 sequences along a path 1367 to a task 1317 to sets the present state, clear the Tx_Act_Flg (transmit active flag) and the Max Attempt count, reset the watch dog timer, and set the STO bit that enables an bus stop sequence to be issued to the bus 150. The microcontroller 301 then sequences along path 1354 to task 1334 to restore the registers and return from the interrupt.

If the microcontroller 301 makes a negative determination in decision task 1312, then the STD 300 has not transmitted the entire packet. In that case, the microcontroller 301 sequences along a path 1364 to a task 1314, in which it decrements the current byte count. The microcontroller 301 then sequences along a path 1356 to transfer task 1306, as described above.

If the microcontroller 301 determines that the status code in the S1STA register indicates that a transmitted data byte was not acknowledged, the microcontroller 301 sequences along a path 1365 to a task 1315 in which it increments the Transmit Attempt counter. The microcontroller 301 then sequences along a path 1366 to a "Max Attempt" decision task 1316 in which it determines whether the value provided by the Transmit Attempt counter corresponds to a predetermined value. If the microcontroller 301 makes a positive determination in decision task 1316, it sequences along a path 1367 to a task 1317, in which it conditions the STO bit to enable a bus stop sequence as described above. The microcontroller 301 then sequences along path 1354 to task 1334 to restore the registers and return from the interrupt.

If the microcontroller 301 makes a negative determination in decision task 1316, which will be the case if it determines that the value provided by the Transmit Attempt counter does not correspond to the predetermined value, then it sequences along a path 1368 to a task 1318, in which it updates the present state, resets the transmit buffer pointer, and re-issues a bus start sequence to enable the packet to be re-transmitted. The microcontroller 301 then sequences along path 1354 to task 1334 to restore the registers and return from the interrupt.

If the microcontroller 301 determines that the status code in the S1STA register indicates that the STD 300 lost arbitration for the bus 150 during the transmission of any of the framing states in the bus packet 500, it (that is, the microcontroller 301) sequences along a path 1369 to a decision task 1319, in which it determines whether the transmit flag is set, indicating that the STD 300 is in an active transmit state. The transmit flag may not be set if, for example, it is cleared by a transmit watchdog timer (not separately shown) internal to the STD 300. If the microcontroller 301 makes a positive determination in decision task 1319, it sequences along a path 1371 to a task 1321 in which it updates the present state, sets the transmit buffer pointer to point to the location in its memory of the first byte of the packet being transmitted, and re-issues a start sequence on the bus 150. The microcontroller 301 then sequences along path 1354 to task 1334 to restore the registers and return from the interrupt.

If the microcontroller 301 makes a negative determination in decision task 1319, which will be the case if the transmit flag is clear, it sequences along a path 1370 to a task 1320, in which it updates the present state and clears flags. The microcontroller 301 then sequences along path 1354 to task 1334 to restore the registers and return from the interrupt.

If the microcontroller 301 determines that the status code in the S1STA register as shown in path 1373, indicating that a destination address framing state for a packet was received, which contained the STD's 300 own address or the General Call address, the microcontroller 301 sequences along a path 1373 to a task 1322 in which it initializes a Receiver Byte Count register, a Receiver Buffer Pointer register, and updates its present state. Thereafter, the microcontroller 301 sequences along a path 1374 to a task 1323, in which it sets a Receive active flag, loads the first byte into a receive buffer register, and increments the Receiver Buffer Pointer. The microcontroller 301 then sequences along path 1354 to task 1334 to restore the registers and return from the interrupt.

If the microcontroller 301 determines that the status code in the S1 STA register indicates that the STD 300, while attempting to transmit a packet, lost arbitration for the bus 150 because the STD's 300 own address or the General Call address were received from bus 150, it (that is, microcontroller 301) sequences along a path 1375 to a decision task 1324, in which it determines whether the STD's transmitter is still active. If the microcontroller 301 makes a positive determination in decision task 1324, it sequences along a path 1377 to a task 1326, in which it re-initializes the transmit buffer pointer and re-starts the bus start sequence for bus 150. Thereafter, the microcontroller 301 sequences along path 1373 to task 1322 receive the packet as described above. On the other hand, if the microcontroller 301 makes a negative determination in decision task 1324, then it sequences directly along path 1373 to task 1322 to receive the packet as described above.

If the microcontroller 301 determines that the status code in the S1STA register indicates that a data byte was successfully received for a packet in which the destination address was the destination address for the STD 300 or the General Call address, it (that is, the microcontroller 301) sequences along a path 1380 to a task 1328, in which it updates the present state, loads a received data byte into the receive buffer and increments the receive buffer pointer. The microcontroller 301 then sequences along path 1354 to task 1334 to restore the registers and return from the interrupt. If the microcontroller 301 determines that the status code in the S1STA register indicates that a stop condition has been received, it sequences along a path 1381 to execute a Slave_Rx_Done task 1331. In task 1331, the microcontroller 301 updates the present state, checks for packet content errors, such as overrun or under-run errors, sets the RX_I2C_CMD (received command) flag for use in task 904 (FIG. 9) and updates other relevant status flags. The microcontroller 301 then sequences along path 1354 to task 1334 to restore the registers and return from the interrupt.

If the microcontroller 301 determines that the status code in the S1STA register is a code other than those described above, which may occur if an error condition exists in connection with the bus 150 or a the STD 300 has received an invalid S1STA status code, the microcontroller 301 sequences along path 1383 to a task 1332. In task 1332, the microcontroller 301 negates data and clock lines of the bus 150. In addition, the microcontroller 301 sequences along a path 1384 to a task 1333, in which it sets an Error Status Bit and sends a bus stop sequence. The microcontroller 301 then sequences along path 1354 to task 1334 to restore the registers and return from the interrupt.

Figure 14:
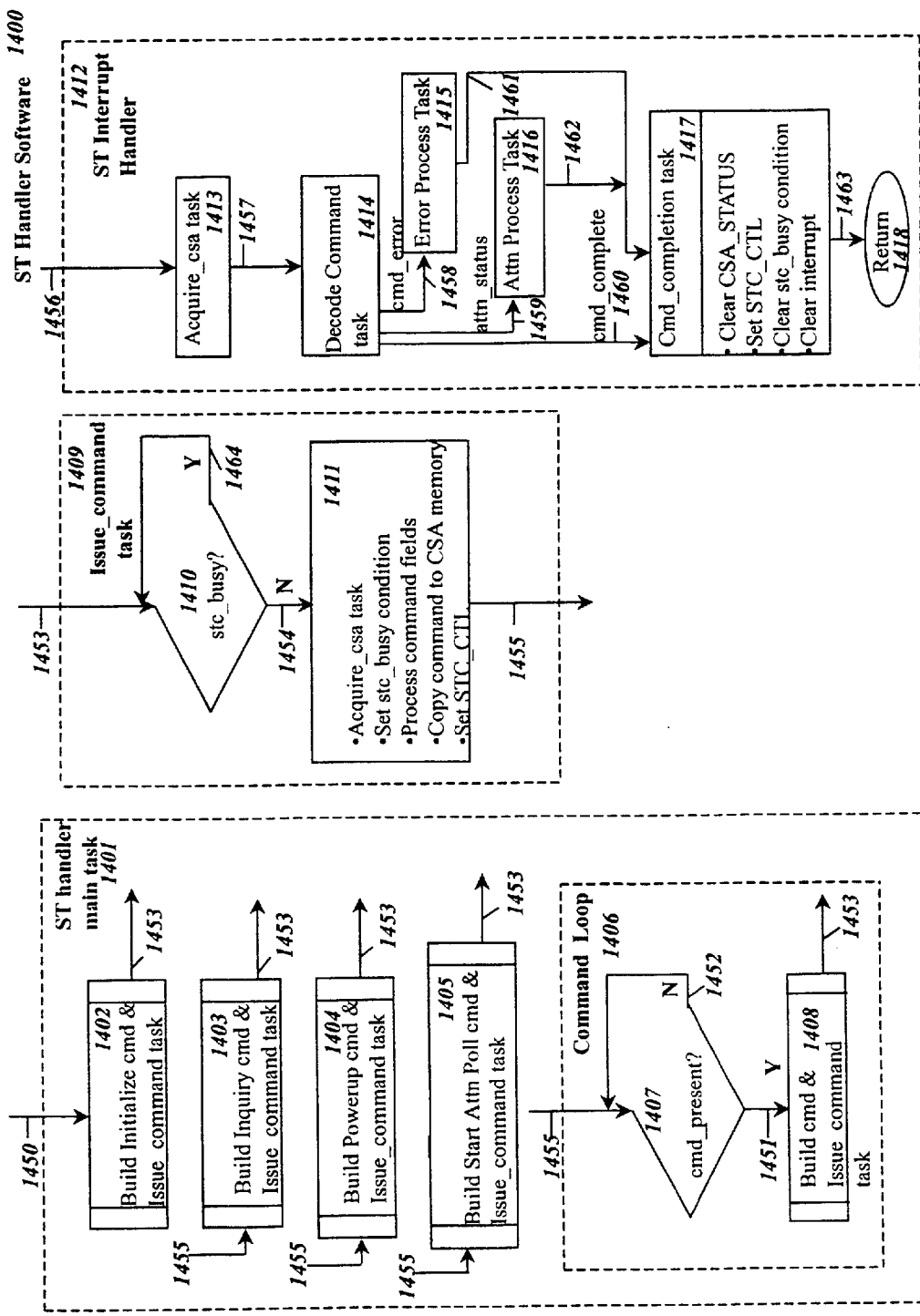
FIG. 14 is a flowchart depicting operations performed in connection with a handler 1400 that controls a host adapter that connects a data storage processor (DSP) to the disk storage subsystems.

FIG. 14 depicts operations performed by the Fibre Channel Host Adapter 105 (FIG. 1) under control of the handler 1400. The handler 1400 specifically is responsible for controlling the STC and, through the STC 400, the STD 300. The handler 1400 resides in memory 112 of the Fibre Channel Host Adapter 105, and is executed by CPU 111 of the respective DSP 101 and 102. The handler 1400 is invoked by commands which may be issued by an operator or software processed by the respective DSP 101 or 102 which serves to control the microcontroller 401 of the STC 400 through the handler 1400. The commands issued to the handler 1400 can control the configurations of the Fibre Channel loops 160 and 170, as described above, the modes for the respective disk-port bypass switches 213 and 215, the powering-up or -down of the drive modules, and so forth.

FIG. 14 illustrates the flowchart of operations performed in connection with handler 1400. The handler 1400 comprises three primary components, including a main task 1401, an Issue_cmd (issue command) task 1409, and an interrupt handler 1412.

The local central processor unit 111 of the Fibre Channel Host Adapter 105 invokes the main task 1401 of the Handler 1400, along path 1450 under control of the operating system when the DSP 101, 102 is initialized. The local central processor unit 111 uses task 1402 to load a value in an STC_CTL control register (not separately shown) located within STC microcontroller 401 to reset the microcontroller 401, to clear an area within memory 403 in which the microcontroller 401 stores status information area, and to enable interrupts from the Fibre Channel host adapter 105 to the central processor unit 103 of the respective DSP 101, 102. Thereafter, in task 1402, the handler 1400 enables the local central processor unit 111 to issue an STD INIT initialization command, as described above, to the STC 400. In issuing the STD INIT command, the central processor unit 111 will actually use the issue command task 1409. From task 1402, the local central processor unit 111 sequences along a path 1453 to a decision task 1410 in the issue command task 1409, in which it determines whether an stc_busy flag is set.

The stc_busy flag is used for synchronization and flow control between the issue command task 1409 and the interrupt handler 1412. After initialization, the stc_busy flag is initially in a reset state. The stc_busy flag will be set by the local central processor unit 111 under control of task 1411 when it issues a command to the STC 400. The stc_busy flag is later reset during processing of the interrupt handler 1412 when the STC 400 interrupts the local central processor unit 111 to notify it that it has completed processing the command. During processing of the issue command task 1409, if the local central processor unit 111 determines in task 1410 that the stc_busy flag is set, which will indicate that the STC 400 is currently processing a command, the local central processor unit 111 will wait until the stc_busy flag is reset to indicate that the STC has completed processing of a previously-issued command. If the local central processor unit 111 determines in task 1410 that the stc_busy flag is set, it will sequence along path 1464 to return to task 1410; thus, the local central processor unit 111 will iteratively process task 1410 while the stc_busy flag is set.

If the local central processor unit 111 determines in processing task 1410 that the stc busy flag is in a reset state, it sequences along a path 1454 to a task 1411. In processing the task 1411, the local central processor unit 111 processes an Acquire_csa task, in which the multiplexer 402 is enabled to enable the local central processor unit 111 to, over ISA bus 153, access the STC's memory 403. In that operation, the local central processor unit 111 conditions the STC_CTL control signals to enable microcontroller 401 to, in turn, condition the ST_RAM_ACC memory access control signal to enable the multiplexer 402 to couple signals between lines 453 and 456, thereby allowing the local central processor unit 111 to access memory 402. When the local central processor unit 111 has access to memory 403, it will set the stc_busy flag. In addition, in processing task 1411, the local central processor unit 111 generates the various fields for the command to be issued to the STC 400, and copies the command into memory 403. Thereafter, the local central processor unit 111 conditions the STC_CTL control signals to enable the microcontroller 401 to, in turn, condition the ST_RAM_ACC signal to enable multiplexer 402 to couple signals between lines 454 and 456, thereby allowing the microcontroller 401 to access memory 402. In addition, local central processor unit 111 conditions the STC_CTL control signals to interrupt the microcontroller 401, which enables it to move out of its executive loop 600 along path 650 (FIG. 6) as described above. Thereafter, the task 1409 enables the local central processor unit 111 to then return along path 1455 to a Build Inquiry command task 1403.

In task 1403, the local central processor unit 111 determines whether STC 400 completes processing of the STC_INIT command successfully. In that operation, the local central processor unit 111 determines whether an end action status, which is generated as described below in connection with the interrupt handler 1412, indicates that the command was successfully processed. If the local central processor unit 111 determines in task 1403 that the STC_INIT command was successfully processed, it builds an STD Inquiry command and sequences along path 1453 to the above-described issue command task 1409 to enable the command to be issued to the STC 400 as described above. Following completion of the issue command task 1409, the local central processor unit 111 returns to task 1404 of the main task 1401.

In task 1404, the local central processor unit 111 determines whether the STC 400 had successfully completed the STD Inquiry command, in a manner similar to that described above in connection with task 1403, and, if it makes a positive determination, builds the STC Drive Power-On/Off command and sequences along path 1453 to the above-described issue command task 1409 to enable the command to be issued to the STC 400 as described above. Following completion of the issue command task 1409, the local central processor unit 111 returns to task 1405 of the main task 1401.

In task 1405, the local central processor unit 111 determines whether the STC 400 had successfully completed the STC Drive Power-On/Off command, in a manner similar to that described above in connection with task 1403. If the local central processor unit 111 makes a positive determination, it builds the STD Start_Attention_Poll command and sequences along path 1453 to the issue command task 1409 to enable the command to be issued to the STC 400 as described above. Following completion of the issue command task 1409, the local central processor unit 111 returns to a command loop 1406 of the main task 1401, in particular to a task 1407.

The command loop 1406, comprising tasks 1407 and 1408, enables the local central processor unit 111 to process commands sent to it by the operator of the respective DSP 101, 102, or by the respective DSP's central processor unit 103 under control of programs being processed thereby. In command loop 1406, the local central processor unit 111 initially processes a cmd_present decision task 1407, in which it determines whether a command queue (not separately shown) in the DSP 101, 102, contains a command posted by the operator or other programs. If the local central processor unit 111 makes a positive determination in the cmd_present state in task 1407, it sequences along a path 1451 to a Build command and issue command task 1408. In task 1408, the local central processor unit 111 builds the respective command for the STC 400, and then sequences along path 1453 to the issue command task 1409 to enable the command to be issued to the STC 400 as described above. Following completion of the issue command task 1409, the local central processor unit 111 returns to the command loop 1406 of the main task 1401, in particular to the task 1407.

Returning to the command present task 1407, if the local central processor unit 111 makes a negative determination in that task 1407, it will sequence along path 1452 to return to task 1407. Accordingly, the local central processor unit 111 will iteratively perform the command present task 1407 until the command queue has a command, after which it will sequence to task 1408.

The interrupt handler 1412 is used to control processing in connection with interrupts received by the local central processor unit from the STC 400, which are signaled by the STC's microcontroller 401 by asserting of the ST_STAT_INT interrupt signal on line 451 (FIG. 4). In response to the assertion of the ST_STAT_INT signal, the local central processor unit 111 begins processing an Acquire_csa task 1413 in the interrupt handler 1412 to enable the multiplexer 402 to allow it to access to the memory 403. When the local central processor unit 111 can access the memory 403, it sequences along path 1457 to a Decode Command task 1414, in which the local central processor unit 111 decodes the status indication loaded by the STC's microcontroller 401 based on the issued command that has completed, and branches based on the status indication. If the local central processor unit determines that the status indication indicates that the command was successfully completed, it sequences along a path 1460 to a command completion task 1417. In the command completion task 1417, the local central processor unit 111 clears the status information in memory 403 and enables the microcontroller 401 to control multiplexer 402 to enable it (that is, the microcontroller 401) to access the memory 403. If the completed command is a STC INIT command, an internal "initialization completed successfully" flag is set to allow the issuance of other commands to the STC 400 under control of the main task 1401 described above. The local central processor unit 111 also clears the stc_busy flag to indicate that the STC 400 is in condition to receive another command, and the microcontroller 401 is enabled to negate the ST_STAT_INT interrupt signal. Following the command completion task 1417, the local central processor unit 111 sequences along a path 1463, and executes a Return instruction 1418 to exit the interrupt handler 1412.

If the local central processor unit 111 determines in task 1414 that the status indication indicates an error condition, it sequences along a path 1458 to an Error Process Task 1415 to process an error. Following task 1415, the local central processor unit 111 sequences along a path 1461 to the command completion task 1417 as described above.

Finally, if the local central processor unit 111 determines in task 1414 that the status indication indicates an attention condition, it sequences along a path 1459 to an Attention Process Task 1416 to process an attention condition. Following task 1416, the local central processor unit 111 sequences along a path 1462 to the command completion task 1417 as described above.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data processing system, comprising:
   a first host;
   a first storage subsystem comprising a first plurality of storage devices;
   a data bus connected to the first host and the first storage subsystem for transmitting data between the first host and the first plurality of storage devices in the first storage subsystem; and
   a control bus connected to the first host and the first storage subsystem for transmitting control signals from the first host to the first storage subsystem and for transmitting status responses from the first storage subsystem to the first host.

2. The digital data processing system of claim 1, wherein the storage subsystem is configured to disconnect one of the first plurality of storage devices from the data bus in response to configuration commands provided by the first host while continuing to connect the remainder of the first plurality of storage devices to the data bus.

3. The digital data processing system of claim 1, wherein:
   the data bus has a loop topology; and
   the first storage subsystem includes a first configuration switch, the first configuration switch having a pass-through mode, in which the loop topology connects the first plurality of storage devices to the data bus, and a bypass mode, in which the loop topology connects a subset of the plurality of devices to the data bus;
   wherein the first configuration switch is configured to change from the pass-through mode to the bypass mode in response to a bypass command received by the first storage subsystem from the control bus.

4. The digital data processing system of claim 1, wherein said control bus transmits said control signals and said status responses in the form of packets.

5. The digital data processing system of claim 4, wherein said packets comprise:
   a start field indicating the beginning of the packet;
   a target address field identifying an intended recipient of the packet;
   a source address field identifying an initiator of the packet;
   a checksum field; and
   an end field indicating the end of the packet.

6. The digital data processing system of claim 5, wherein said packets further comprise an operation code field indicating an operation to be performed by the recipient of the packet.

7. The digital data processing system of claim 5, wherein said packets further comprise a data field containing a message or command.

8. The digital data processing system of claim 7, wherein said packets further comprise a length field indicating the size of the data field.

9. The digital data processing system of claim 1, wherein:
said first host is configured to transmit an attention command control signal via the control bus to the first storage subsystem, said attention command control signal instructing the first storage subsystem to transmit a status response indicating the status of one of the plurality of storage devices.

10. The digital data processing system of claim 1, further comprising one or more additional hosts, each of said one or more additional hosts being connected to the first storage subsystem via the control bus and the data bus.

11. The digital data processing system of claim 1, wherein at least one of the storage devices in the first plurality of storage devices comprises a disk storage device.

12. The digital data processing system of claim 1, wherein said first storage subsystem further comprises a first subsystem controller connected to the control bus, said first subsystem controller configured to receive the control signals from the first host via the control bus and to transmit status responses to the first host via the control bus.

13. The digital data processing system of claim 1, wherein the control bus comprises an $I_2C$ bus.

14. A method of operating a digital data processing system, comprising:
connecting a first host to a first storage subsystem comprising a first plurality of storage devices via a data bus and a control bus;
transmitting data via the data bus between the first host and the first storage subsystem;
transmitting control signals via the control bus from the first host to the first storage subsystem; and
transmitting status responses via the control bus from the first storage subsystem to the first host.

15. The method of claim 14, further comprising:
transmitting a configuration command via the control bus from the first host to the first storage subsystem; and
in response to receiving the configuration command from the first host, the first storage subsystem disconnects one of the first plurality of storage devices from the data bus while continuing to connect the remainder of the first plurality of storage devices to the data bus.

16. The method of claim 14, further comprising:
transmitting data along the data bus, said data bus having a loop topology;
transmitting a bypass command via the control bus from the first host to the first storage subsystem; and
in response to receiving the bypass command, the first storage subsystem switches from a pass-through mode, in which the loop topology connects the first plurality of storage devices to the data bus, to a bypass mode, in which the loop topology connects a subset of the plurality of devices to the data bus.

17. The method of claim 14, further comprising:
transmitting the control signals from the first host in packet form; and
transmitting the status responses from the first storage subsystem in packet form.

18. The method of claim 17, wherein said packets comprise:
a start field indicating the beginning of the packet;
a target address field identifying an intended recipient of the packet;
a source address field identifying the initiator of the packet;
a checksum field; and
an end field indicating the end of the packet.

19. The method of claim 18, wherein said packets further comprise an operation code field indicating an operation to be performed by the recipient of the packet.

20. The method of claim 18, wherein said packets further comprise a data field containing a message or command.

21. The method of claim 20, wherein said packets further comprise a length field indicating the size of the data field.

22. The method of claim 14, further comprising:
transmitting an attention command control signal via the control bus from the first host to the first storage subsystem; and
in response to receiving the attention command control signal, transmitting a status response via the control bus from the first storage subsystem to the first host, said status response indicating the status of said one of the plurality of storage devices.

23. The method of claim 14, further comprising:
connecting a second host to the first storage subsystem via the data bus and the control bus;
transmitting data via the data bus between the second host and the first plurality of storage devices in the first storage subsystem;
transmitting control signals via the control bus from the first host to the first storage subsystem; and
transmitting status responses via the control bus from the first storage subsystem to the second host.

24. The method of claim 14, wherein at least one of the storage devices in the first plurality of storage devices comprises a disk storage device.

25. The method of claim 14, wherein:
receiving the control signals from the first host with a first subsystem controller provided in the first storage subsystem; and
transmitting the status responses to the first host with the first subsystem controller.

* * * * *